(12) United States Patent
Malaczynski et al.

(10) Patent No.: US 11,454,608 B2
(45) Date of Patent: Sep. 27, 2022

(54) PARTICULATE MATTER DETECTION SYSTEM AND METHOD

(71) Applicant: DELPHI TECHNOLOGIES IP LIMITED, St. Michael (BB)

(72) Inventors: Gerard Wladyslaw Malaczynski, Bloomfield Hills, MI (US); Gregory Thomas Roth, Davison, MI (US)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 1157 days.

(21) Appl. No.: 15/678,194

(22) Filed: Aug. 16, 2017

(65) Prior Publication Data

US 2019/0056340 A1 Feb. 21, 2019

(51) Int. Cl.
*F01N 3/023* (2006.01)
*G01N 27/16* (2006.01)
*F01N 11/00* (2006.01)
*G01N 15/06* (2006.01)

(52) U.S. Cl.
CPC ............. *G01N 27/16* (2013.01); *F01N 11/00* (2013.01); *G01N 15/0656* (2013.01); *F01N 2560/05* (2013.01); *F01N 2560/20* (2013.01)

(58) Field of Classification Search
None
See application file for complete search history.

(56) References Cited

U.S. PATENT DOCUMENTS

| | | |
|---|---|---|
| 8,677,803 B2 | 3/2014 | Hocken et al. |
| 8,823,401 B2 | 9/2014 | Roth et al. |
| 2011/0265551 A1 | 11/2011 | Hopka et al. |
| 2012/0186230 A1* | 7/2012 | Yahata ................ F02D 41/1466 60/274 |
| 2013/0233051 A1* | 9/2013 | Harshbarger ........... F01N 11/00 73/23.31 |
| 2014/0090361 A1 | 4/2014 | Hopka et al. |
| 2015/0211429 A1 | 7/2015 | Hocken et al. |
| 2018/0073415 A1 | 3/2018 | Malaczynski et al. |

OTHER PUBLICATIONS

SAE International, 2012-01-0372, published Apr. 16, 2012, "Sensing of Particulate Matter for On-Board Diagnosis of Particulate Filters", Harry Husted, Gregory Roth, Scott Nelson, Lary Hocken, Gary Fulks, David Racine; Delphi Automotive Systems, LLC.

* cited by examiner

*Primary Examiner* — Jill E Culler
*Assistant Examiner* — Ruben C Parco, Jr.
(74) *Attorney, Agent, or Firm* — Joshua M. Haines

(57) ABSTRACT

A method of operating a particulate matter sensor having a pair of spaced apart electrodes and a heater includes accumulating particulate matter on the sensor, thereby changing resistance between the pair of spaced apart electrodes. The particulate matter sensor includes a sensing cycle that includes a deadband zone, followed by an active zone, which is followed by a regeneration zone in which the heater is operated to elevate the temperature of the particulate matter sensor to a first predetermined temperature for a first predetermined time in order to oxidize the particulate matter accumulated on the particulate matter sensor. The method also includes interrupting the sensing cycle with a modified regeneration zone which is either higher in temperature or length than the regeneration zone.

13 Claims, 15 Drawing Sheets

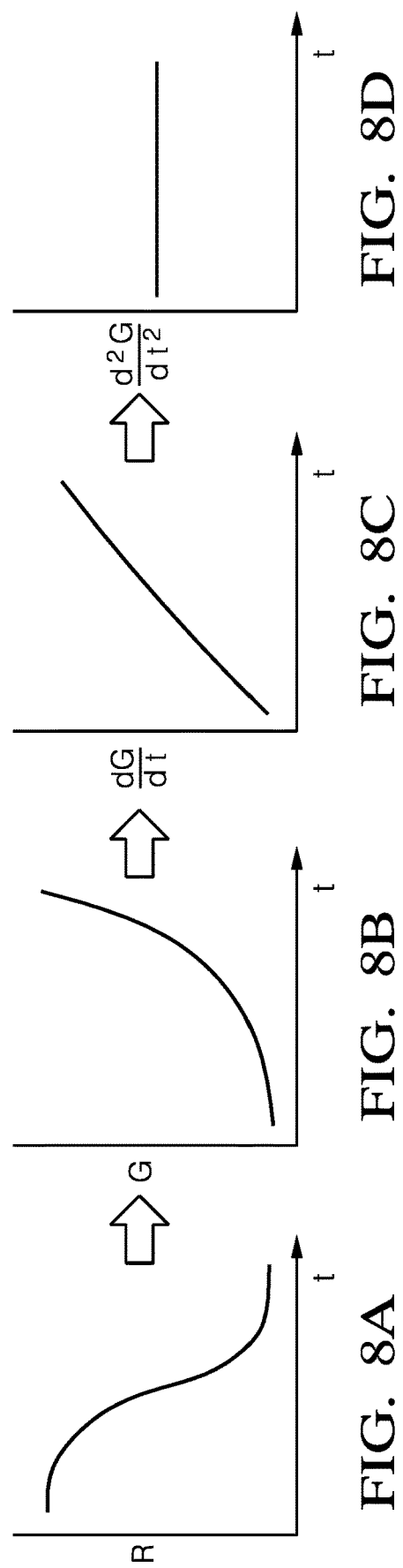

PARTICULATE MATTER DETECTION SYSTEM AND METHOD

TECHNICAL FIELD OF INVENTION

This disclosure relates to a system and method of detecting particulate matter using a particulate matter sensor throughout a particulate matter sensor measurement cycle; and more particularly to system and method which utilizes a modified regeneration when conditions are met.

BACKGROUND OF INVENTION

Rich combustion conditions, such as those which occur in diffusion flame processes that are present in diesel engines and other internal combustion engines, produce particulate matter, which is carried in its exhaust stream. Particulate matter emissions are typically limited by emissions regulations and it is common for modern diesel engines to be equipped with a particulate filter. As part of the emissions regulations, diagnosis of the particulate filter is mandated and the use of a particulate matter sensor is one such diagnostic system. Thus, it is desirable to accurately measure particulate matter real-time in vehicles to ensure that the engine and particulate filter are operating in compliance with government regulations. It is also desirable to measure particulate matter using emissions testing equipment during engine development on a dynamometer, for example.

One type of particulate matter sensor includes electrodes that are closely spaced on an electrically non-conductive substrate. As particulate matter accumulates between the electrodes, the sensor's electric resistance decreases as the initially non-conductive substrate surface between electrodes becomes gradually more electrically conductive due to the deposited particulate matter (PM) or soot, which is indicative of the amount of particulate matter in the sensed exhaust pipe, either directly produced by the combustion process or its remnants escaping the action of the particulate filter.

During the measurement cycle, a typical particulate matter sensor only measures soot during an active zone. Once a predetermined threshold has been reached, which corresponds to the sensor being saturated with soot to a predefined extent, the sensor undergoes regeneration to prepare the sensor to again measure the accumulation of soot. Regeneration involves operating a heater in order to elevate the particulate matter sensor to a predetermined temperature for a predetermined time sufficient to oxidize and remove the accumulated particulate matter. Subsequent to regeneration and prior to reaching the active zone, the sensor has a deadband zone in which there has been no measurement of soot due to the very small change in conductance within the sensor during the initial soot deposition period.

Experimentally-observed step-like changes in the measured soot deposit conductance or resistance are commonly attributed to either occasional bombardment of the PM sensor with particles much larger than that represented by the typical size within the particles' distribution, or loss of the already deposited particulate matter due to blow-offs, i.e. particulate matter re-entry into the exhaust stream. This alternation of soot conductance or resistance gradient measured in the time domain corrupts the soot concentration assessment algorithm which is based on measure of the cycle time, i.e. time markers representing selected sensor resistances indicating the start of the sensing cycle and the end of the sensing cycle. However, the assumption that the step-like changes of the PM sensor signal represents large particle strikes or blow-offs is not quite correct since detailed analysis of the disturbance indicates that the mechanics of accumulation of soot particles on the PM sensor may be much more complicated and include, for example, partial separation followed by secondary re-settling at the surface of the PM sensor in the form of conglomerates of the soot particles originally representing a dimension within the size of the normal spectrum. This phenomenon is generally associated with the ineffective oxidation, i.e. cleaning, of the PM sensor during the sensor regeneration period. Consequently, such a scenario makes the conversion of the measured soot deposit rate into soot concentration very difficult, since the parasitic effect of partial deposit separation is purely random and results from corrupted adhesion to the PM sensor with byproducts of an incomplete cleaning process. The effectiveness of cleaning of the PM sensor through oxidation is a function of the temperature to which the heater elevates the PM sensor and the time the PM sensor is exposed to this elevated temperature. While increasing the temperature and exposure time during regeneration may increase the effectiveness of regeneration, thereby increasing the reliability of the detection capability of the PM sensor, the increased temperature and exposure time may have undesirable consequences on the service life of the PM sensor.

There is a need to obtain and interpret accurate readings from the particulate matter sensor for the range of scenarios that the particulate matter sensor will be exposed.

SUMMARY OF THE INVENTION

Briefly described, a method of operating a particulate matter sensor having a pair of spaced apart electrodes and a heater is provided. The method includes accumulating particulate matter on the particulate matter sensor, thereby changing resistance between the pair of spaced apart electrodes, wherein the particulate matter sensor provides a signal that varies based upon an amount of the particulate matter on the particulate matter sensor. The particulate matter sensor includes a sensing cycle that includes a deadband zone in which the resistance is greater than a first predetermined value, followed by an active zone in which the resistance is less than or equal to the first predetermined value, which is followed by a regeneration zone in which the heater is operated to elevate the temperature of the particulate matter sensor to a first predetermined temperature for a first predetermined time in order to oxidize the particulate matter accumulated on the particulate matter sensor, thereby returning the sensing cycle to the deadband zone. The method also includes interrupting the sensing cycle with a modified regeneration zone in which the heater is operated to elevate the temperature of the particulate matter sensor in order to oxidize the particulate matter accumulated on the particulate matter sensor, thereby returning the sensing cycle to the deadband zone, wherein the modified regeneration zone includes at least one of 1) elevating the temperature of the particulate matter sensor to a second predetermined temperature which is greater than the first predetermined temperature and 2) elevating the temperature of the particulate matter sensor for a second predetermined time which is longer than the first predetermined time. The method increases the reliability of the output of the PM sensor while maintaining the service live longevity that is desired of the PM sensor by minimizing thermal stress to which the PM sensor is subjected.

A controller is also provided which carries out the method of operating the particulate matter sensor.

BRIEF DESCRIPTION OF DRAWINGS

The disclosure can be further understood by reference to the following detailed description when considered in connection with the accompanying drawings wherein:

FIGS. 8A, 8B, 8C and 8D respectively illustrate a resistance signal, a conductance signal, and a first derivative of the conductance signal in the case of constant soot concentration, constant sensor surface temperature, constant exhaust gas velocity, and a second derivative of the conductance signal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION OF INVENTION

Figure 1:
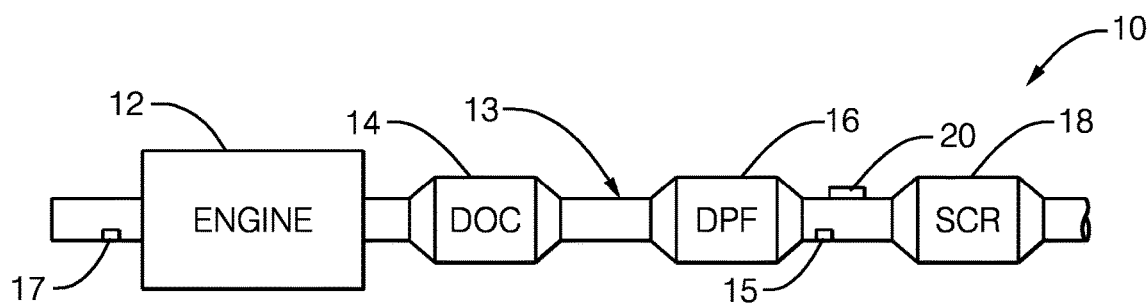
FIG. 1 is a schematic view of an exemplary powertrain system.

An example vehicle powertrain system 10 is shown in FIG. 1. The system 10 includes an engine 12, which in this non-limiting exemplary embodiment is a diesel engine, fluidly connected to an exhaust system 13 that includes a diesel oxidation catalyst (DOC) 14 and a diesel particulate filter (DPF) 16. A selective catalyst reduction (SCR) catalyst, such as those used in conjunction with a urea injection system, is arranged downstream from the DPF 16.

A particulate matter (PM, also referred to as "soot") sensor 20 is arranged in the exhaust system 13, typically in proximity to the DPF 16, although it should be understood that the PM sensor 20 may be located elsewhere. The PM sensor 20 is configured to be exposed to the exhaust stream and accumulate PM on its internal sensing element. The PM sensor 20 provides a resistance signal that varies based upon an amount of the PM on the sensor.

An exhaust gas temperature sensor 15 is arranged in the exhaust stream in proximity to the PM sensor 20 to provide an exhaust temperature (T) signal. An air flow sensor 17 may be placed in the intake to the engine or an estimator may be used to provide exhaust mass flow rate and velocity. These signals can be used for measurement compensation and converting the measured PM values to various unit formats. Alternatively, instead of providing gas temperature sensor 15, the PM sensor can offer the temperature measurement if a temperature sensing element is integrated with the sensor structure.

Figure 2:
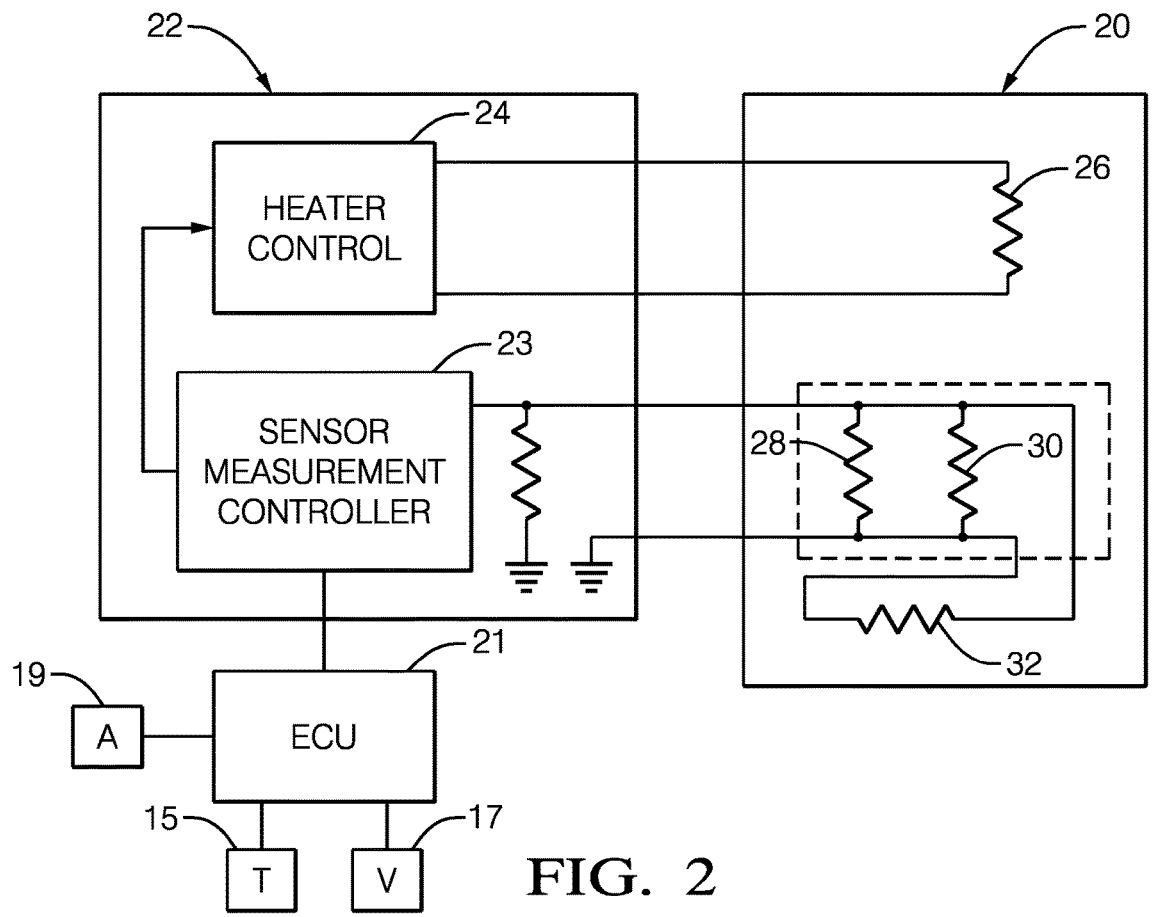
FIG. 2 is a circuit schematic for a particulate matter sensor and its controller.
Figure 3:
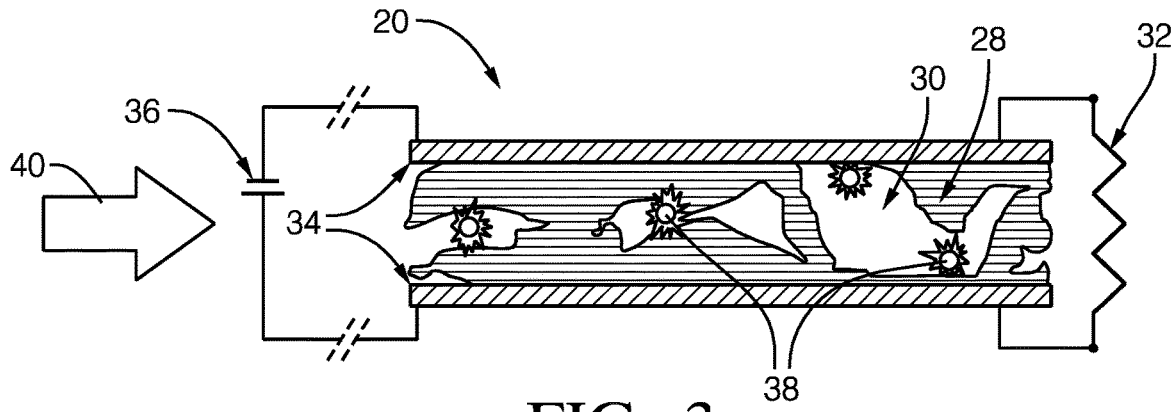
FIG. 3 is schematic of the particulate matter sensor during a particulate matter particle strike.

Referring to FIG. 2, a control system 21, such as an engine control unit (ECU), is in communication with a PM sensor controller 22 which includes a sensor measurement controller 23 that controls a sensing cycle (e.g., shown in FIGS. 4A and 4B) for the sensor based upon its resistance. The ECU 21 is in communication with reference data 19 for the cross-sectional area (A) of the exhaust passage as well as the temperature sensor 15 and air flow sensor 17. In one type of PM sensor 20, soot, substrate, and bias resistor 28, 30, 32 are connected in parallel with one another. The substrate resistor 30 represents the resistance of a "clean", i.e. not contaminated with the soot deposit, sensor 20, and the bias resistor 32 is used for diagnosing the sensor 20. The substrate resistance is very large relative to the other resistances. The soot-representing resistor 28 is provided by a pair of spaced apart electrodes 34 such that when no PM is present, the electrodes provide an open circuit in parallel with bias resistor 32 and substrate resistance 30 with a power source 36, as shown in FIG. 3 such that power source 36 is configured to provide a variable bias voltage across electrodes 34 as will be described in greater detail later. As PM 38 in the exhaust stream 40 deposits on the sensor surface between electrodes 34, the soot deposit resistance in parallel with the bias resistor provides gradually decreasing effective electrical resistance (increasing effective electrical conductance) of the sensor measured by the system electronics.

After a predetermined sensor electrical conductance is reached, which represents a maximum desired soot accumulation at the sensor surface, there is a need for the removal of the soot as further soot accumulation might lead to a poor reliability of the data interpretation and carry a risk of ineffective soot oxidation (cleaning) procedure with the heater 26 integrated with the sensor. Returning to FIG. 2, to begin the sensing cycle again, the sensor measurement controller 23 commands a heater module 24 to activate a sensor heater 26 in the PM sensor 20, which oxidizes the accumulated PM and regenerates the sensor, typically in response to a threshold total accumulated particulate matter being reached.

The PM sensor controller 22 can be part of an onboard vehicle PM sensing system or part of an emissions testing system suitable for use in, for example, a test laboratory during engine testing and calibration. In the example of an emissions test system, the PM sensor controller 22 may output particulate matter data to a laboratory data acquisition system during the engine test procedure.

Figure 4A:
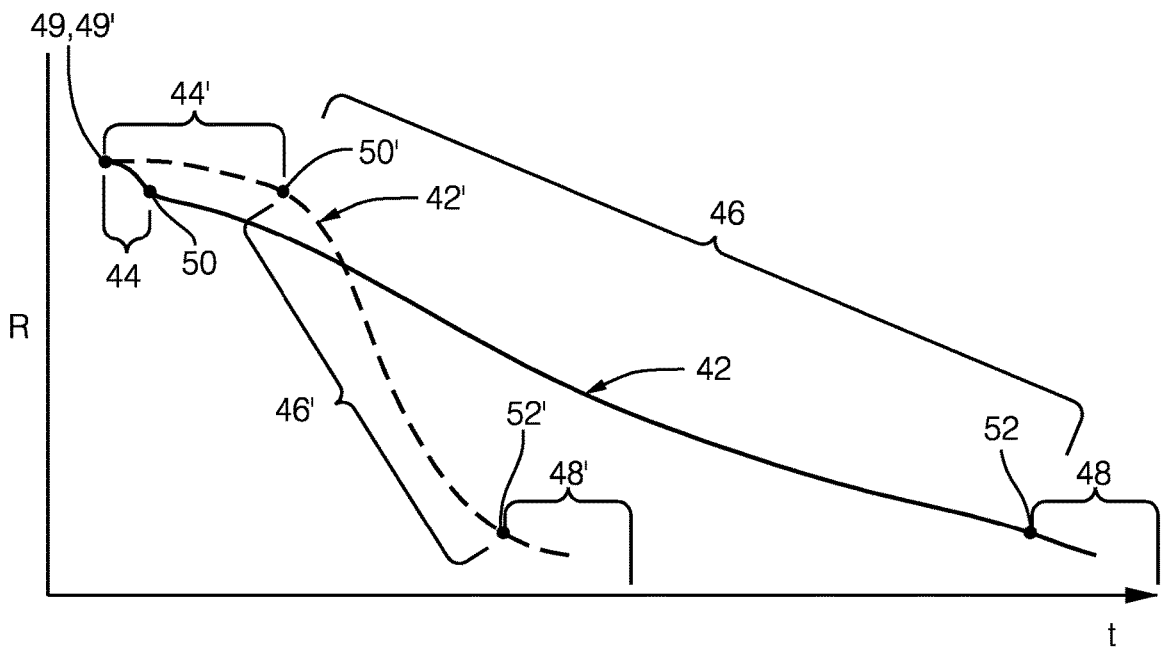
FIG. 4A is a graph of a sensing cycle, based upon resistance versus time, produced using a variable bias voltage and a graph of a sensing cycle produced using a fixed bias voltage.
Figure 4B:
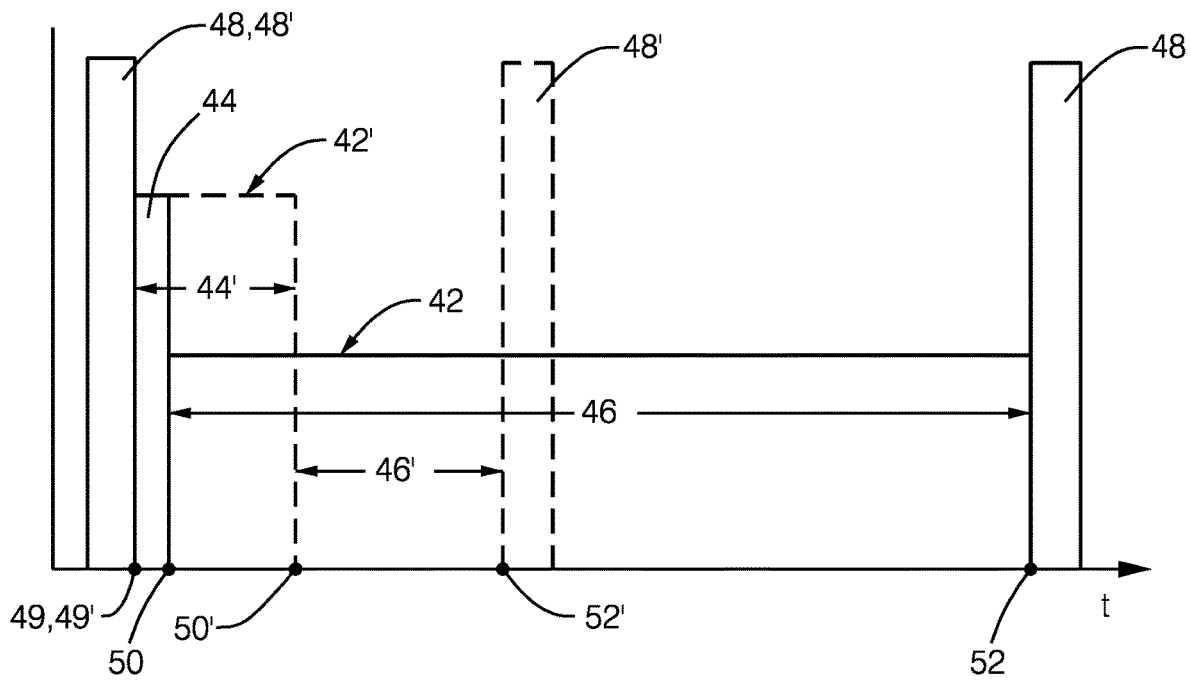
FIG. 4B is a schematic illustrating various zones during the sensing cycle comparing use of a variable bias voltage to a fixed bias voltage.

One example sensing cycle 42 is shown in FIGS. 4A and 4B. Referring to FIG. 4B, the sensing cycle 42, shown as a solid line, has a deadband zone 44, an active zone 46 and a regeneration zone 48. As shown in FIG. 4A, prior to the starting point 50 of the active zone 46, the resistance of the sensor 20 is high since sufficient PM has not yet accumulated in the sensor 20 to bridge the electrodes 34. In this deadband zone, from the end of regeneration 49 to the starting point 50, no meaningful data is typically gathered concerning PM accumulation. Also in this deadband zone 44, the power source 36 applies a first bias voltage $V_{b1}$ across electrodes 34 where first bias voltage $V_{b1}$ may be, by way of non-limiting example only, a value from about 24V to about 48V. The deadband zone exit point 50 is defined as a first point along the measured electric conductance trace, which can be reliably identified and is sufficiently free of stochastic noise. In one example, the sensor resistance at the end of regeneration 49 is around 10 MΩ, and the sensor resistance at the starting point 50 is around 8 MΩ. From the starting point 50 to a stopping point 52, which may be around 1 MΩ, the resistance steadily decreases, which is indicative of PM accumulation. Also in the active zone 46, i.e. from starting point 50 to the stopping point 52, the power source 36 applies a second bias voltage $V_{b2}$ across electrodes 34 where second bias voltage $V_{b2}$ is less than first bias voltage $V_{b1}$ and may be, by way of non-limiting example only, a value from about 3V to about 6V. As shown in FIGS. 4A and 4B, deadband zone 44 is the result of first bias voltage $V_{b1}$ being 48V and second bias voltage $V_{b2}$ being 3V. For comparison purposes, FIGS. 4A and 4B have been provided with a typical sensing cycle 42', shown in dashed lines, resulting from a typical 12V bias voltage applied during both a deadband zone 44' and an active zone 46' where a starting point 50' of active zone 46' commences at the same resistance value as starting point 50 of active zone 46' and where a stopping point 52' of active zone 46' concludes as the same resistance value as stopping point 52 of active zone 46 (it should be noted that some portions of sensing cycle 42' are obscured in FIG. 4B by the solid line of sensing cycle 42, namely the first regeneration zone 48' and the beginning of deadband zone 44'). As can be seen, the increased bias voltage during deadband zone 44 reduces the time required to complete deadband zone 44 as compared to the time required to complete deadband zone 44'. This decreased time duration to complete deadband zone 44 as compared to completed deadband zone 44' is attributed to the greater rate of soot accumulation as a result of the increased electrophoresis effect produced by the higher bias voltage. Also as can be seen, the decreased bias voltage during active zone 46 increases the time required to complete active zone 46 as compared to the time required to complete active zone 46'. This increased time to complete active zone 46 is attributed to a smaller rate of soot accumulation as a result of the decreased electrophoresis effect produced by the lower voltage. Consequently, sensing cycle 42, which uses different bias voltages for deadband zone 44 and active zone 46, advantageously provides a higher percentage of time that PM sensor 20 is able to provide a measurable resistance change in response to soot accumulation as compared to sensing cycle 42' which uses the same bias voltage in both deadband zone 44' and active zone 46'. Table 1 is provided below which illustrates simulated time duration data for sensing cycle 42' which in this particular example uses 12V as the bias voltage for both deadband zone 44' and active zone 46'. Table 1 also illustrates simulated time duration data for sensing cycle 42 using two different values for the bias voltage applied during deadband zone 44 and active zone 46 and two different values for the bias voltage applied during active zone 46. As can be seen, using a traditional bias voltage scheme results in the PM sensor being available to provide a measurable resistance change in response to soot accumulation for only 55% of the time whereas using an initially greater voltage during deadband zone 44 followed by a lesser voltage during active zone 46 significantly increase the time PM sensor 20 is available to provide a measurable resistance change in response to soot accumulation, and in the case of 48V being selected for $V_{b1}$ and 3V being selected for $V_{b2}$, PM sensor 20 is available to provide a measurable resistance change in response to soot accumulation for 94% of the time.

TABLE 1

| Bias Voltage (Deadband Zone, Active Zone) | Regen Zone Time (s) | Deadband Zone Time (s) | Active Zone Time (s) | Total Cycle Time (s) | Availability |
|---|---|---|---|---|---|
| 12 v, 12 v | 30 | 300 | 400 | 730 | 55% |
| 24 v, 6 v | 30 | 150 | 800 | 980 | 82% |
| 48 v, 3 v | 30 | 75 | 1600 | 1705 | 94% |

The value ranges provided previously for first bias voltage $V_{b1}$ and second bias voltage $V_{b2}$ were provided by way of non-limiting example only, and may be different depending on design parameters of PM sensor 20. It is desirable for first bias voltage $V_{b1}$ to increase as the dielectric breakdown voltage of the specific design of PM sensor 20 increases, or conversely, decrease as the dielectric breakdown voltage of the specific design of PM sensor 20 decreases. Factors that determine the dielectric breakdown voltage of PM sensor 20 are, by way of non-limiting example only, the materials that are used to manufacture PM sensor 20 and the distance of separation between electrodes 34. The dielectric breakdown voltage of a particular PM sensor design can be determined experimentally as would be readily understood by one of ordinary skill in the art. Consequently, first bias voltage $V_{b1}$ may be expressed as a percentage of the dielectric breakdown voltage of PM sensor 20, and may be 20% to 50% of the breakdown voltage of PM sensor 20 which allows for rapid soot accumulation without approaching the dielectric breakdown voltage too closely. Similarly, second bias voltage $V_{b2}$ may be expressed as a percentage of the dielectric breakdown voltage of PM sensor 20, and may be 1% to 20% of the breakdown voltage of PM sensor 20 which allows for an extended time period of active zone 46. However, second bias voltage $V_{b2}$ must take into account the value selected for first bias voltage $V_{b1}$, for example, if first bias voltage $V_{b1}$ is selected to be 20% of the dielectric breakdown voltage of PM sensor 20, second bias voltage $V_{b2}$ would not be selected to be 20% of the dielectric breakdown voltage of PM sensor 20. Consequently, in a further consideration, as a percentage of the dielectric breakdown voltage of PM sensor 20, the difference between second bias voltage $V_{b2}$ and first bias voltage $V_{b1}$ is at least 10%.

Traditionally, soot measurements where only made by the PM sensor 20 at the conclusion of the active zone 46, ignoring the deadband zone 44 and the active zone itself 42. The response time (from the end of regeneration 49 to the end of active zone 52) is traditionally the measure used to assess cumulative soot mass. Between the stopping point 52 (onset of regeneration) and conclusion of deadband (point 50, FIG. 4A) preceded by regeneration (48 in FIG. 4B), no meaningful data can be directly gathered as the resistance measurement during regeneration (as commanded by the sensor measurement controller 23) changes abruptly in the response to soot oxidation and after, for the duration of the deadband zone 44, remains generally unchanged, since the sensor experiences an early soot accumulation period dominated by the bias resistor.

The sensor measurement controller 23 is configured to identify an error effect based upon an anomaly relating to the accumulation of the particulate matter. One such anomaly is due to large particle (LP) strikes on the sensor 20. It can be appreciated that once the size of a large particle approaches the width of the electrodes 34, the deposition of this large particle across the electrodes results in a step-like decay of the measured sensor resistance. This step change in resistance is then erroneously interpreted as spikes in soot flux and leads to erroneous interpretation of the measured time elapsed between zone markers (i.e., starting and stopping points 50, 52) representing calibrated sensor resistance thresholds. Thus, in addition to obtaining an inaccurate total accumulated PM, the sensing cycle will be unnecessarily shortened, which results in proportionally more time in the deadband zone 44 and the regeneration zone 48 wherein PM data is not collected. Noticeably, same size large particle strikes result in gradually decreasing step size in the affected sensor resistance trace as time/deposition of soot progresses. The reason for this non-linearity in the sensor signal response to same size large particle strike lies in the fact that the sensor resistance is the combination of the three resistors 28, 30, 32 connected in parallel, and resistance representing gradually increasing soot deposit.

Conversely, a particle blow-off condition creates another anomaly in which a step-like increase of the measured sensor resistance occurs due to particles becoming dislodged from between the electrodes 34. An additional condition in which a large particle or agglomerate makes intermittent contact with the sensor electrodes 34 is sensed as a blow-off condition that alternates with large particle strikes in a repeated manner is termed "an unstable soot deposit condition." This surface instability where the resistance signal suddenly increases and then decreases again in a repeating pattern is undesirable for PM flux measurement. The sensor measurement controller 23 initiates a sensor regeneration when an unstable soot deposit condition is detected as no meaningful PM accumulation data can be gathered (cycle abort procedure).

Figure 5:
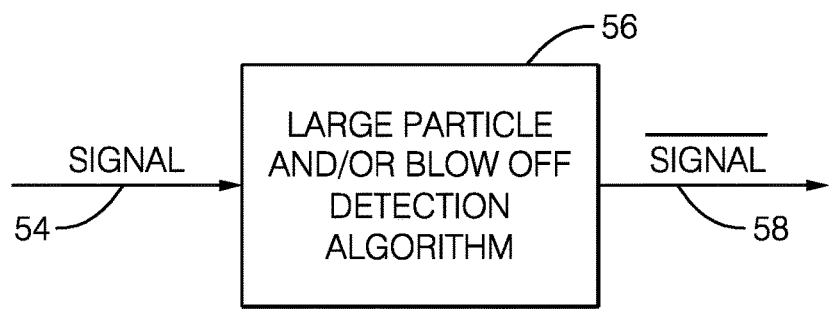
FIG. 5 schematically depicts a signal correction to remove an error effect based upon an anomaly relating to particulate matter accumulation on the sensor.
Figure 9A:
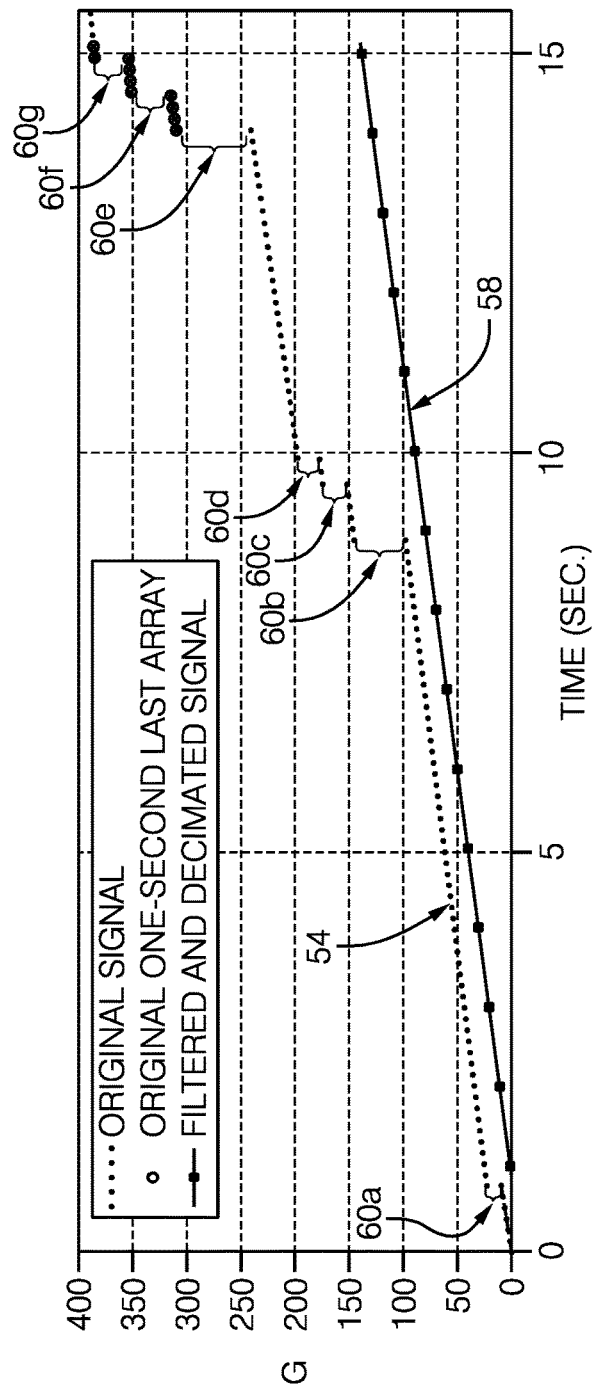
FIG. 9A illustrates a corrupted original conductance signal and a reconstructed conductance signal after conforming erroneous data points, identified by analyzing the first differential of the corrupted conductance signal, which is shown in FIG. 9B.
Figure 9B:
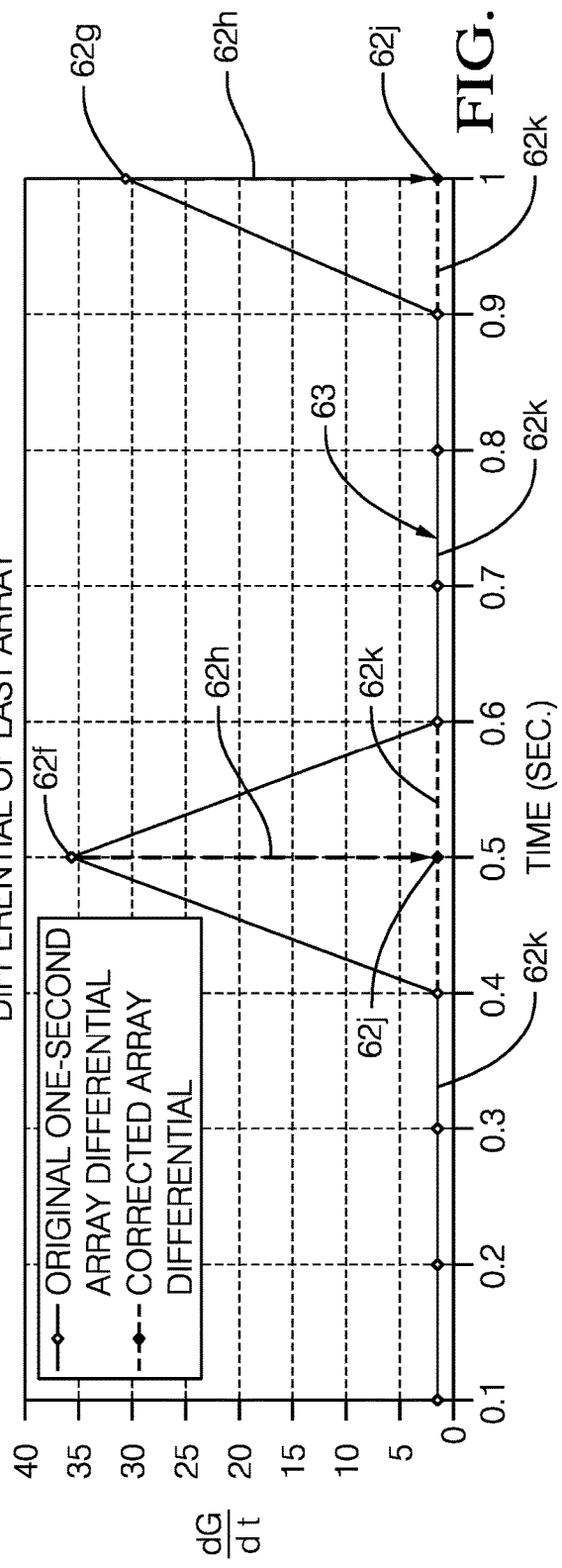
FIG. 9B illustrates the first differential of the corrupted conductance signal with the erroneous data points, and a corrected first differential of the corrupted conductance signal after the erroneous data points have been conformed.

FIG. 5 schematically depicts a signal correction of a corrupted signal 54 to remove the above error effects 56 based upon an anomaly, such as large particle strikes and/or blow-offs that occur during particulate matter accumulation on the sensor. A reconstructed signal 58 is generated with the error effects removed. An example of signal correction is depicted in FIGS. 9A and 9B, for example.

Figure 6A:
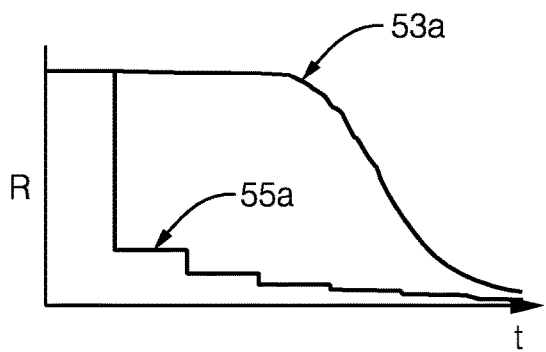
FIG. 6A illustrates a "clean" signal and a "corrupted" signal in resistance versus time.
Figure 7A:
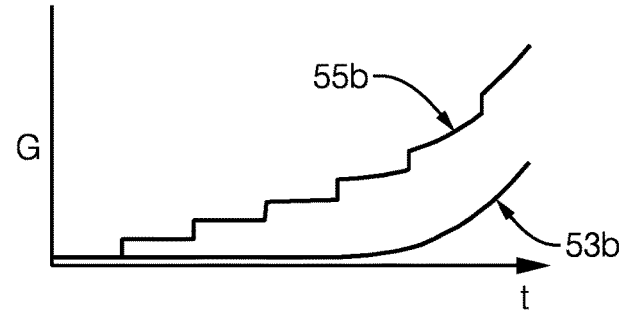
FIG. 7A illustrates a "normal" signal and a "corrupted" signal in conductance versus time for the resistance shown in FIG. 6A.
Figure 6B:
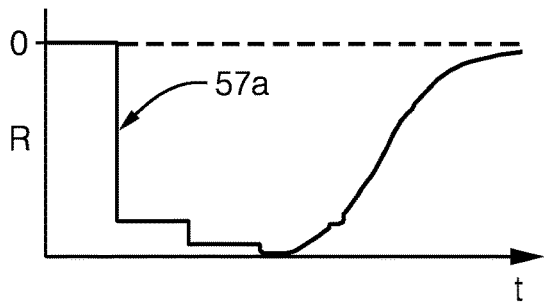
FIG. 6B illustrates the difference between the "normal," i.e., not affected by large particles strikes and/or blow-offs, signal and the "corrupted" signal shown in FIG. 6A.
Figure 7B:
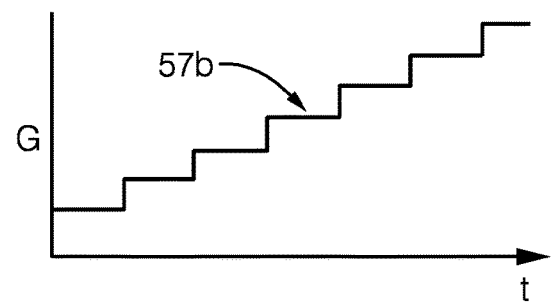
FIG. 7B illustrates the difference between the "normal" conductance signal and the "corrupted" sensor's conductance signal shown in FIG. 7A.

FIG. 6A illustrates a "normal" signal 53a and a large particles strike-"corrupted" signal 55a in resistance versus time for an identical, repetitive large particle strike condition. FIG. 6B illustrates the mathematical difference between the "normal" signal and the "corrupted" signal shown in FIG. 6A ("corrupted" minus "normal"), which highlights non-linearity induced by algorithms operating in the electrical resistance domain when processing the PM sensor signal. Thus, the sensor measurement controller 23 is configured to convert the resistance signal to a conductance signal, which provides a signal shape that is much easier to process-even when corrupted. FIG. 7A illustrates a "normal" signal and a "corrupted" signal in the conductance domain versus time, which is generally parabolic in shape with anomalies generated by identical large particle strikes inducing well-behaved step changes. FIG. 7B illustrates the mathematical difference between the "normal" signal and the "corrupted" signal shown in FIG. 7A ("corrupted" minus "normal"), which provides a more manageable, uniform step response to large particle strikes.

Thus, the disclosed correction method converts the resistance signal (FIG. 8A) to the conductance signal (FIG. 8B), which is a generally parabolic shape for engine steady-state conditions (constant soot flux, constant sensor surface temperature, and constant exhaust velocity). The first differential of the conductance is calculated (FIG. 8C), which provides a generally linear signal. The error effect in the first differential of conductance will manifest itself as erroneous data points that depart from the otherwise generally linear signal. The large particle condition will manifest itself as a sudden short duration increase in the first differential of the conductance (sudden decrease in resistance signal). Conversely, the blow-off condition will manifest itself as a sudden short duration decrease in the first differential of the conductance (sudden increase in resistance signal). Once the abnormalities are removed and the conductance signal of the sensor reconstructed without the effect of large particle strikes and/or blow-offs the second differential of conductance (FIG. 8D) is calculated and provides a measure of soot flux.

The sensor measurement controller 23 is configured to determine a total accumulated particulate matter while accounting for the error effect of large particles and/or blow-offs. Referring to FIGS. 9A and 9B, a corrupted signal due to large particle strikes is shown, which results in erroneous data points that are dissimilar to the trend provided by the other data points. A differential of the conductance signal is calculated at a first sampling frequency. Consecutive differentials are compared to identify an erroneous differential in an abnormal signal based upon an anomaly relating to the accumulation of the particulate matter. In the example, the first sampling frequency includes a first sample point from a previous array, and the second sampling frequency includes decimated samples from the corrected array. The erroneous differential in the abnormal signal is reconstructed to produce a corrected, decimated conductance signal at a second sampling frequency that is lower than the first sampling frequency.

In the example, the conductance signal is sampled at, for example, 100 ms intervals (FIG. 9A), and after replacement of conductance differential array elements (FIG. 9B) violating the threshold limits for large particles and blow-offs, the conductance array is reconstructed at a fraction of the original sampling frequency, in the illustrated case at one second intervals (FIG. 9A, dots linked by solid line). Of course, other time intervals can be used, if desired. The data in FIG. 9B is for a small time period and therefore does not reflect the second order curvature that is present in the full cycle data set.

The large particle strikes are indicated by the increases 60a-60g, resulting in a corrupted signal 54. FIG. 9B more closely examines the first differential of the signal at 60f and 60g that respectively correspond to the increases 60f and 60g with anomalies evident in the differential at 62f and 62g respectively. The controller 22 identifies these erroneous data points by sampling the conductance signal at a high rate (in this example 100 ms), creating an array of 11 closely spaced samples, for example. This array is then differentiated, which facilitates identification of anomalies by comparison of adjacent sample amplitudes. The normal operation of the sensor produces a relatively stable differential array with small fluctuations. Large deviations (above a threshold level) are identified anomalies (62f and 62g), which are the subject of correction. The algorithm then modifies the identified points by leveling the differential (62h) to the normal level in that array, resulting in the conformed differentials 62j. The conformed signal 62k is then used for reconstruction of sensor conductance 58 (generally straight line in FIG. 9A) in new sampling domain (in our example 1 second).

For large particle conditions corrected in the manner above, an accurate total accumulated particulate matter of normal size distribution is represented by the corrected conductance trace. The large particle strike condition causes a sudden decrease in the resistance signal (or increase in conductance). However, for large particle conditions, the conformed erroneous data points represent removal of the particle from the ongoing measurement. To maintain overall accuracy, the large particles are accounted for by calculating the effective size of the large particle based on the size of the disturbance and then added to the normal particulate accumulation mass to provide an accurate total accumulated particulate matter.

The formulas for detecting the anomalies may be programmed using the syntax described below. The differential between two subsequent readings is not expected be larger than a certain pre-defined level (called threshold(1)) under normal PM accumulation if compared to the prior measured differential, otherwise the data point is flagged as being a large particle anomaly.

In general, an input array of differential d may have size length(d) which is indicated in the formulation below and is shown as an input array of ten elements in FIG. 9B, which illustrates how the 100 ms sampled conductance differential signal is transformed 62h to reconstruct the error-free (large particles-free) conductance differential 62j and then the decimated conductance signal 58 in FIG. 9A in 1 second sampling domain (correction followed by decimation).

The syntax for large particles detection may look as follows:

```
for m=1:length(d)-1
    if (d(m+1)-d(m))>threshold(1)
        flag1=flag1+1;
        a1=a1+d(m+1)-d(m);
        d(m+1)=d(m);
    end
end
```

This formula provides for correction of excessive differential to the previous one in the array, which relies upon overlapping one of the ten element arrays of signal differentials by one sample from the previous array to allow for correction when the first element in the array violates the threshold. The last element of the previous array is provided only to compare to the first element of new array and "level" (if correction is needed) the first element in the new array with the last element of the previous array. Alternatively, if the desired correction is expected to "level" the output to an average of a few previous readings, then the overlap in the array needs to be adjusted accordingly.

If the correction formula is expanded to more than one element overlap, the sizes of the arrays, number of elements fed back with 1 second delay, and number of elements grounded at the output must be adjusted accordingly.

Similarly, with a different threshold level (threshold(2)) calibration assigned for the detection of blow-offs, the corresponding portion of the syntax embedded into the module may look as follows:

```
for m=1:length(d)-1
    if d(m+1)<-threshold(2)
        flag2=flag2-1;
        a2=a2+d(m+1)-d(m);
        d(m+1)=d(m);
    end
end
```

A particulate blow-off condition on the sensor causes a sudden increase in the resistance signal (or decrease in conductance). The reconstructing step includes increasing the erroneous conductance differential to a level represented by a previous, not questionable or already corrected element, or mean or median of previous elements, in the pre-defined in length array or earlier array if the questionable element is first in a currently processed array.

The subroutines for large particles and blow-off detections follow each other in the algorithm and are executed only if the violation of the relevant threshold level(s) is/are sensed. This action facilitates counting independently the occurrences of large particle (flag1), blow-off (flag2) conditions, and adds up independently the differential amplitudes indicative of large particle and blow-off events (a1 and a2), which provide information on the severity of the misbehavior. Also, when the large particle differential a1 is scaled (calibrated) it provides additional information regarding cumulative mass of the deposit and/or size of the large particles involved. Sizing of the differential a2 can be used to assess severity of the blow-off, thus is useful in the interpretation of the phenomena, but is not used when monitoring total cumulative deposit, as the blow-off-corrected conductivity signal inherently nullifies the signal corruption induced by blow-offs. The core output of the filter, however, is an array of corrected conductance signal differentials which is subsequently used to reconstruct the input conductance signal in the new sampling domain of 1 second, for example.

The correction procedure starts at the conclusion of the sensor regeneration 48 and ends at the conclusion of active zone 46 and the onset of next regeneration. The reading of the sensor resistance/conductance, when compared to calibrated maximum conductance marking the upper limit of soot accumulation at the sensor's surface (FIG. 4A, point 52) provides the trigger signal for the sensor regeneration. The reading of the sensor conductance at the onset of the new cycle is represented by the conductance of the clean (not contaminated with soot) substrate in parallel with the bias resistor.

While large particle strikes are expected to be rare, unusual events, it is expected that minute blow-offs occur frequently. If all negative differentials of the conductance were flagged as blow-offs, electronic noise would be misinterpreted as minute blow-off and, therefore, create erroneous corrections. Consequently, the threshold level for blow-offs is set at the level ignoring the system-specific electronic noise. The blow-off threshold level, threshold(2), can be experimentally selected to filter out this "background" effect so that the reconstructing step is performed above the minimum blow-off detection level. Similarly, every particle strike results in a minute increase of the conductance. However, only very large particle strike events require the filter action leading to the correction of the conductance signal. Consequently, the threshold level, threshold(1), which violation initiates the correction for large particle strike is set differently and its value can be roughly estimated using a simulation-based-calibration modeling technique.

Figure 10:
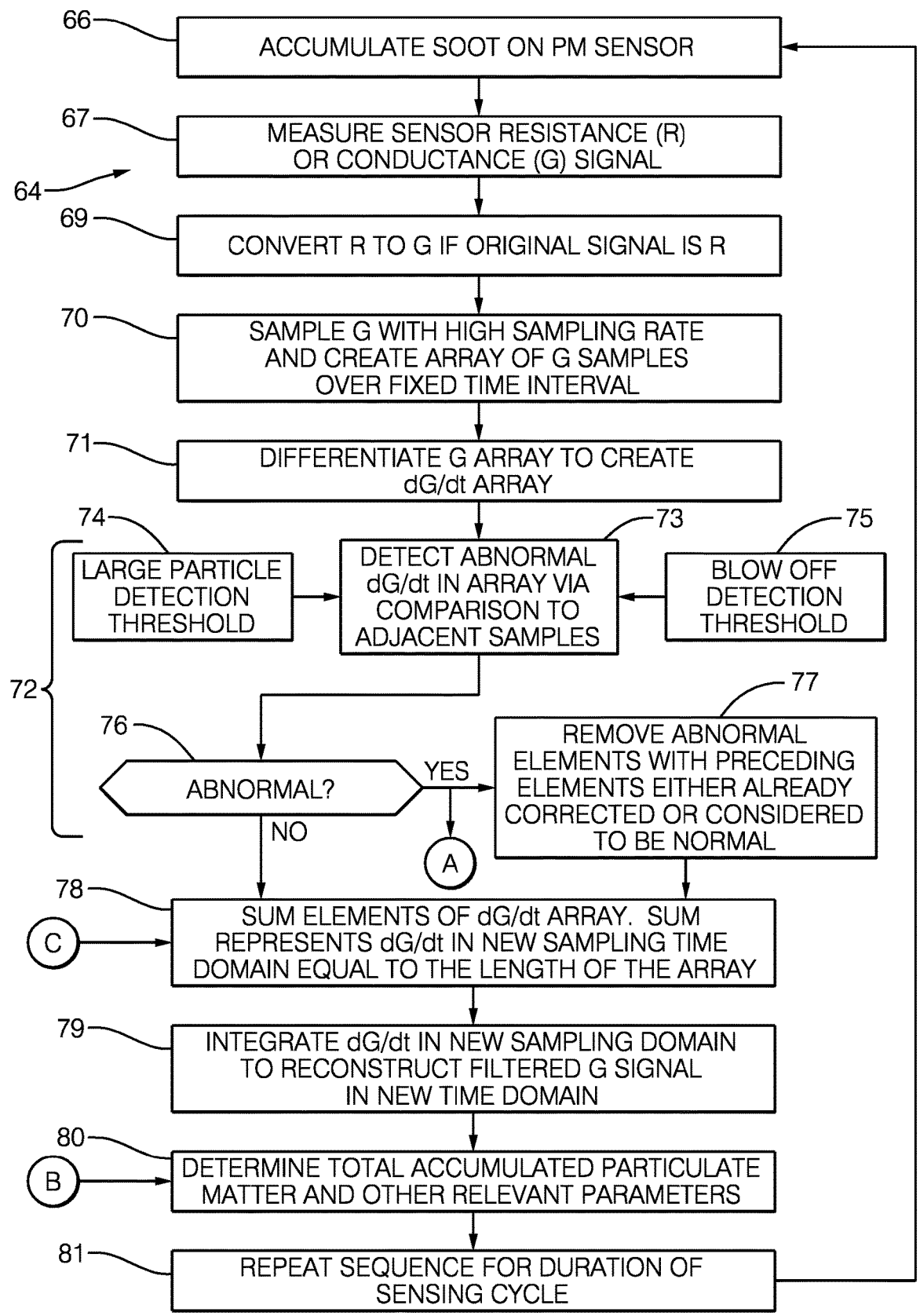
FIG. 10 is a flow chart depicting an example method of correcting a particulate matter sensor signal.

In summary, one example method 64 of PM measurement and correction is illustrated in the flowchart shown in FIG. 10. Soot is accumulated on the PM sensor 20, as indicated at block 66. The amount of PM is output as a resistance signal (and later converted to conductance in block 69), or as a conductance signal, as indicated in block 67. Conductance is sampled at a relatively high rate to create a conductance array over a fixed time interval (block 70), and a first differential array of the conductance is created (block 71).

Anomalies are detected in an abnormal first differential signal of the conductance by making comparisons to adjacent samples, as indicated by block 73. Using large particle strike and blow-off detection thresholds (blocks 74 and 75), undesired deviations from the adjacent samples are identified, and if sufficiently abnormal (block 76), are removed with respect to normal sample points to remove the error effects of the anomaly (block 77). The sample points in the revised array of the first differential of conductance are then summed in a new sampling time domain equal to the length of the array (block 78), and this new sampling time domain can then be reconstructed to provide a filtered conductance signal that is error-free with respect to the anomaly (block 79). The total accumulated PM and other relevant parameters can then be determined from this corrected conductance signal (block 80). The sequence can be repeated throughout the measurement cycle (block 81) to provide a continuous output of total accumulated PM during engine operation in a vehicle or an engine dynamometer.

Figure 10A:
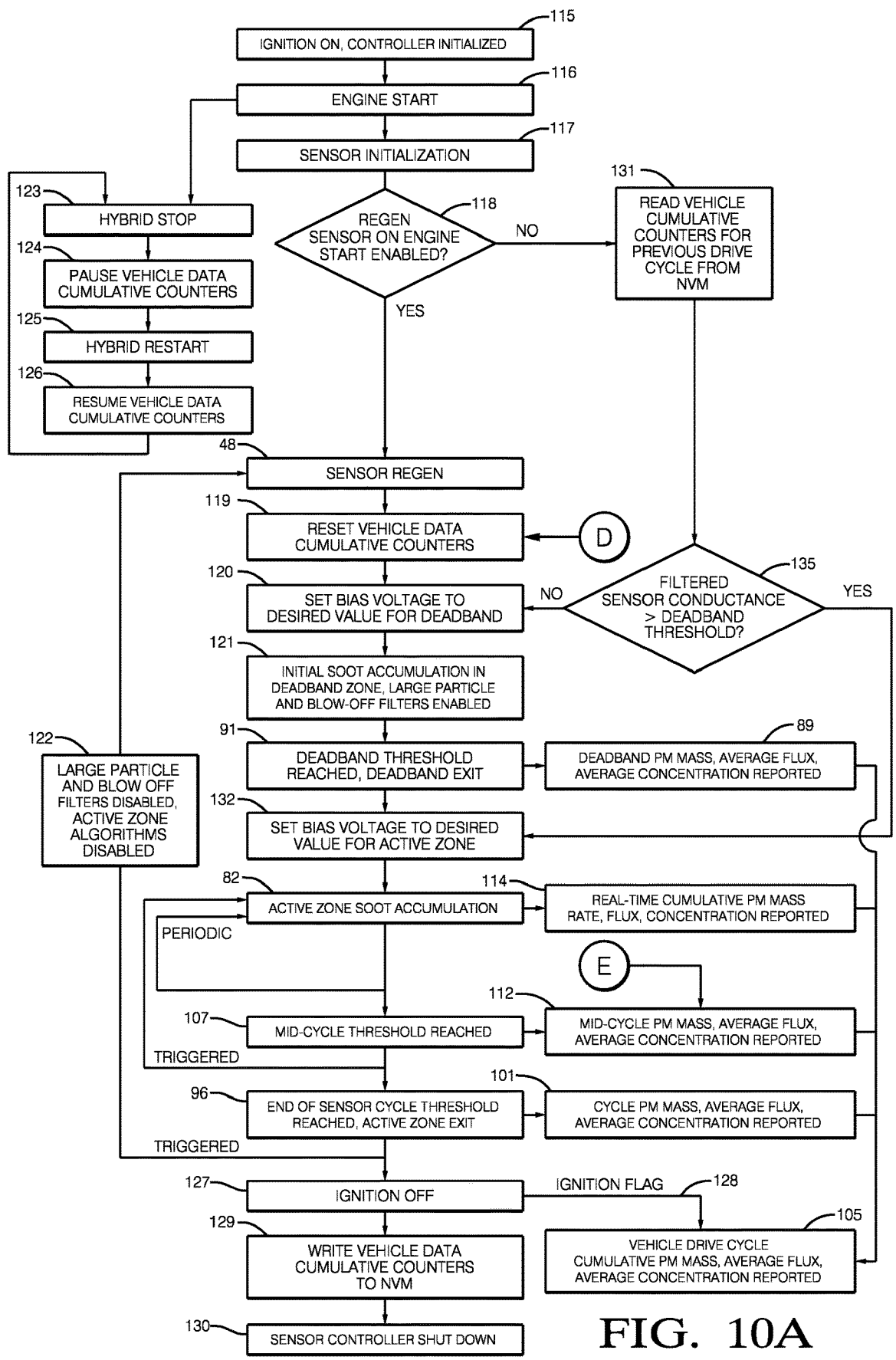
FIG. 10A is a flow chart depicting overall sensor and sensor controller operation.

FIG. 10A provides the overall flowchart of sensor and sensor controller algorithms. Further detail of each block is contained below. When vehicle ignition is turned on, the PM sensor controller initializes 115. Once the engine is started 116, the sensor initializes 117, a determination is made if regeneration of PM sensor 20 is desired at block 118, for example based on the state of sensing cycle 42 when the ignition was turned off 127. If a determination at 118 indicates that regeneration is desired, PM sensor 20 regenerates 48. After regeneration 48, vehicle data cumulative counters are reset 119, first bias voltage $V_{b1}$ is commanded to be applied 120 to electrodes 34, and soot accumulation 121 begins in deadband zone 44. The sensor cycle continues in the deadband zone 44 until the deadband threshold is reached 91, at which time the deadband PM measurements are reported 89 and second bias voltage $V_{b2}$ is commanded to be applied 132 to electrodes 34. The sensor continues into the active zone 82 and periodically reports instantaneous PM information 87 (shown in FIG. 11D) and real time cumulative PM information 114. When mid-cycle thresholds are reached 107, mid-cycle PM parameters are reported 112 and the PM accumulation and real-time instantaneous reporting continues. Mid-cycle thresholds may include discrete resistance values, such as 5 MΩ or 3 MΩ, for example. When the end of cycle threshold is reached 96, typically around 1.5 MΩ, cycle PM parameters are reported 101, abnormal event filters and active zone algorithms are disabled 122, and sensor regen 48 initiated. If engine 12 employs a start-stop strategy where engine 12 stops automatically after a period of idling and then restarts automatically based on driver input, for example the brake pedal being released, blocks 123, 124, 125, 126 may be employed where engine 12 is stopped 123 resulting in a pause of the vehicle data cumulative counters 124. If engine 12 is restarted 125, vehicle data cumulative counters are resumed 126. When the ignition is turned off 127, which may happen when the sensor is in any of the three operational zones 44, 46, 48, ignition flag 128 triggers vehicle drive cycle PM parameters to be reported 105 and vehicle data cumulative counters to be written to non-volatile memory (NVM) 129 before the controller shuts down 130. The cumulative drive cycle totals may be used to more directly determine the efficiency of the diesel particulate filter 16. Previously DPF efficiency could only be inferred based upon measuring the entire cycle time. Alternatively, if a determination at 118 indicates that regeneration is not desired, vehicle data cumulative counters from previous drive cycle are retrieved from non-volatile memory 131 and a determination is made if filtered sensor conductance is greater than the deadband threshold 135. If a determination is made that the filtered sensor conductance is not greater than the deadband threshold, the method proceeds to block 120 such that first bias voltage $V_{b1}$ is commanded to be applied 120 to electrodes 34 as was described previously. However, if a determination is made that the filtered sensor conductance is greater than the deadband threshold, the method proceeds to block 132 such that second bias voltage $V_{b2}$ is commanded to be applied 132 to electrodes 34 as was described previously.

Along with the corrected signal 58 that is delivered by the large particle filter 56, a rejected large particle signal amplitude 83 is made available to a large particle mass estimation algorithm 84. The mass each large particle is added to a cumulative large particle mass variable that is retained throughout the sensor cycle, and made available 113 to the other PM measurement algorithms described below.

Figure 10B:
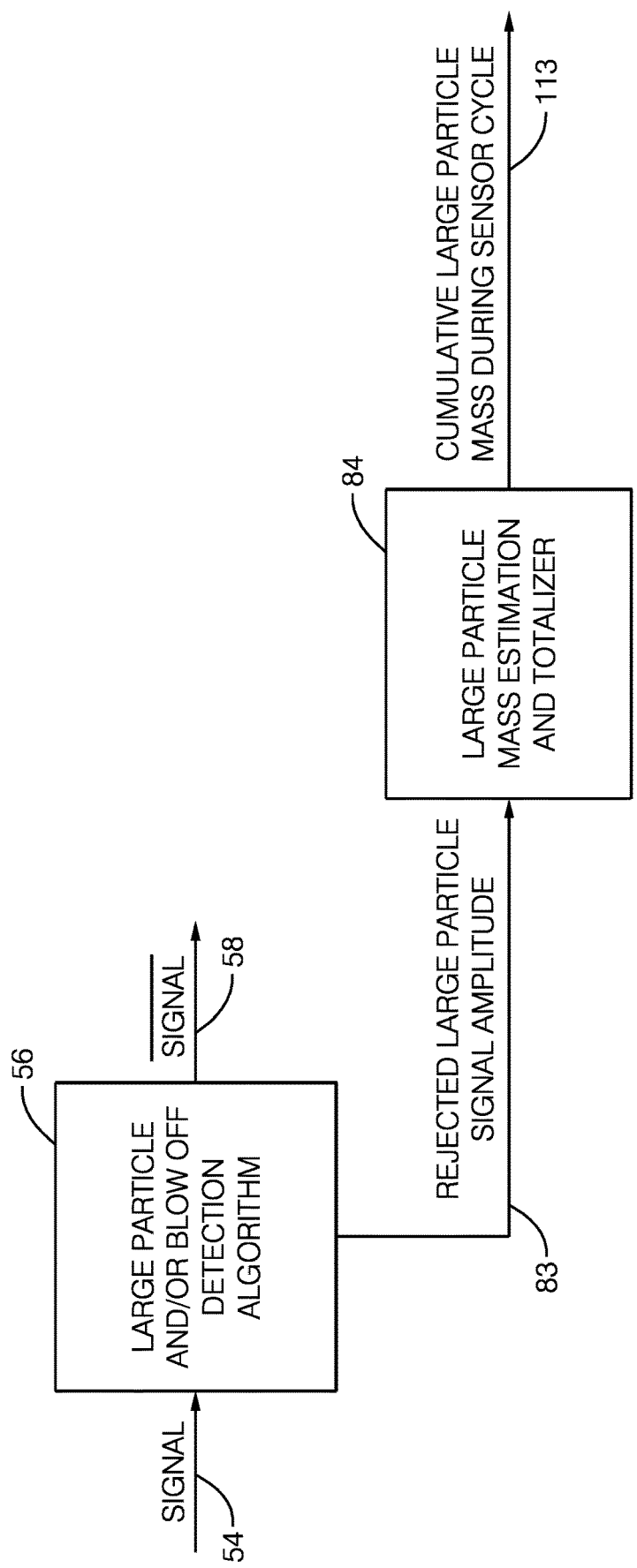
FIG. 10B schematically depicts the use of the rejected signal from the correction method in FIG. 10 to determine the mass of a large particle.

Typical PM measurement systems make no corrections for large particle or blow-off conditions. According to one aspect of this disclosure, it is possible to detect large particle strikes and blow-offs using the detection methods described above and generate a disturbance free signal 58. This signal is inherently compensated for blow-offs since they represent PM mass that existed on the sensor for some period of time, but then left the sensor electrodes. Large particles, on the other hand, have been removed from the disturbance-free signal and therefore their mass is unaccounted for. FIG. 10B provides a method in which each large particle is sized and added to a cumulative mass value for use when reporting total mass in subsequent algorithms. Referring now to FIG. 10B, the large particle filter 56 evaluates signal 54 to find and remove anomalies to generate corrected signal 58. The large particle filter also quantifies the amplitude of the large particle disturbance that is being rejected 83. The amplitude of this disturbance is correlated with the size of the particle which created the disturbance and method 84 determines the size of each large particle and adds its mass to a totalizer to track cumulative large particle mass 113 up to that point in the sensor cycle. This large particle mass is utilized by subsequent methods as described in FIGS. 11A-E.

FIGS. 11A-11E describe the use of corrected signal to extract information about PM mass, flux and concentration at various points in the sensor cycle and vehicle drive cycle. With the disclosed method shown in FIG. 5, deadband time can now be used to generate PM mass, average concentration, and average flux outputs at the end of the deadband period as described in FIG. 11A. Signal 58 and timer data 94 (which exists internally in controller 22) along with a deadband threshold calibration 90 is used to generate a deadband flag 92 and deadband time 93. The deadband time is used along with exhaust temperature 15, velocity 17 and pipe area 19 to determine (59) PM mass, average flux, and average concentration during the deadband period. These outputs 88 can be made available 89 to the ECU at the end of deadband. Evaluation of DPF performance can be made using these outputs, allowing a diagnostic decision to be made 25% to 50% sooner than the typical method, which relied upon the response time measurement approach previously described.

In operation, according to one example embodiment, the PM sensor 20 outputs a resistance at the conclusion of the deadband zone (point 50). This resistance measurement can be correlated to cumulative PM mass flux (mg/m2) using a look-up table that is determined empirically. For example, the time may be measured from point 49 to point 50, which corresponds to a threshold resistance, e.g., 8 MΩ for one type of PM sensor 20. This deadband time corresponds to the cumulative soot flux, which is compensated using the exhaust gas temperature (T) and velocity. Average soot flux for the deadband zone can then be calculated as well as average soot concentration, and total soot mass using the exhaust gas velocity (V) and cross-sectional area (A), as shown below.

Average Soot Concentration (mg/m³)=Deadband Cumulative Soot Flux (mg/m²)/(deadband time(s)*Avg. Velocity (m/²))

Total Soot Mass (mg)=Deadband Cumulative Soot Flux (mg/m²)*Cross-sectional Area (m²)

Avg. Soot Flux (mg/m²*s)=Deadband Cumulative Soot Flux (mg/m²)/Deadband time (s)

Figure 11A:
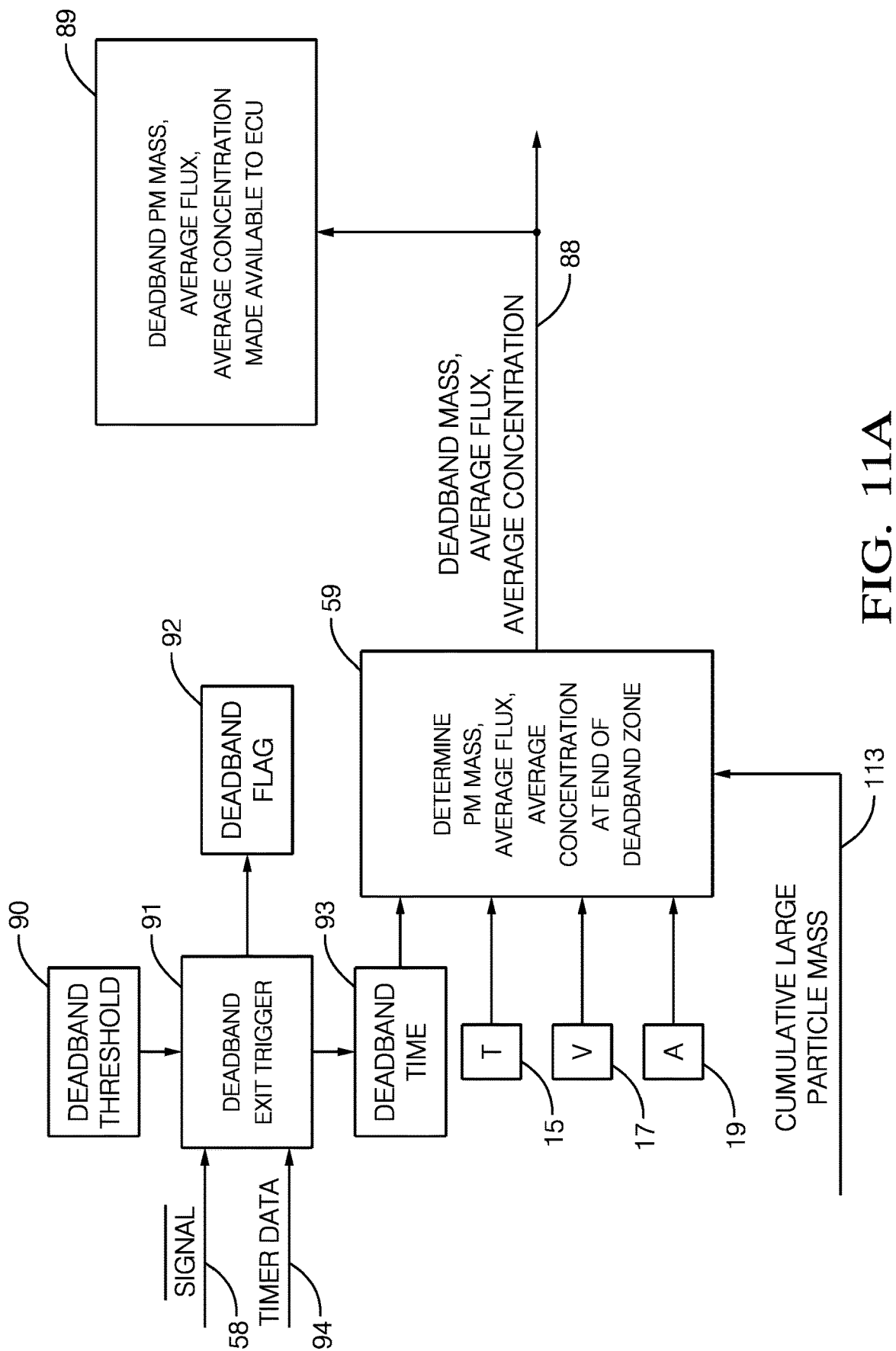
FIG. 11A schematically depicts the use of the corrected signal to determine PM mass, average flux, and average concentration at the end of the deadband zone of the current sensor cycle.
Figure 11B:
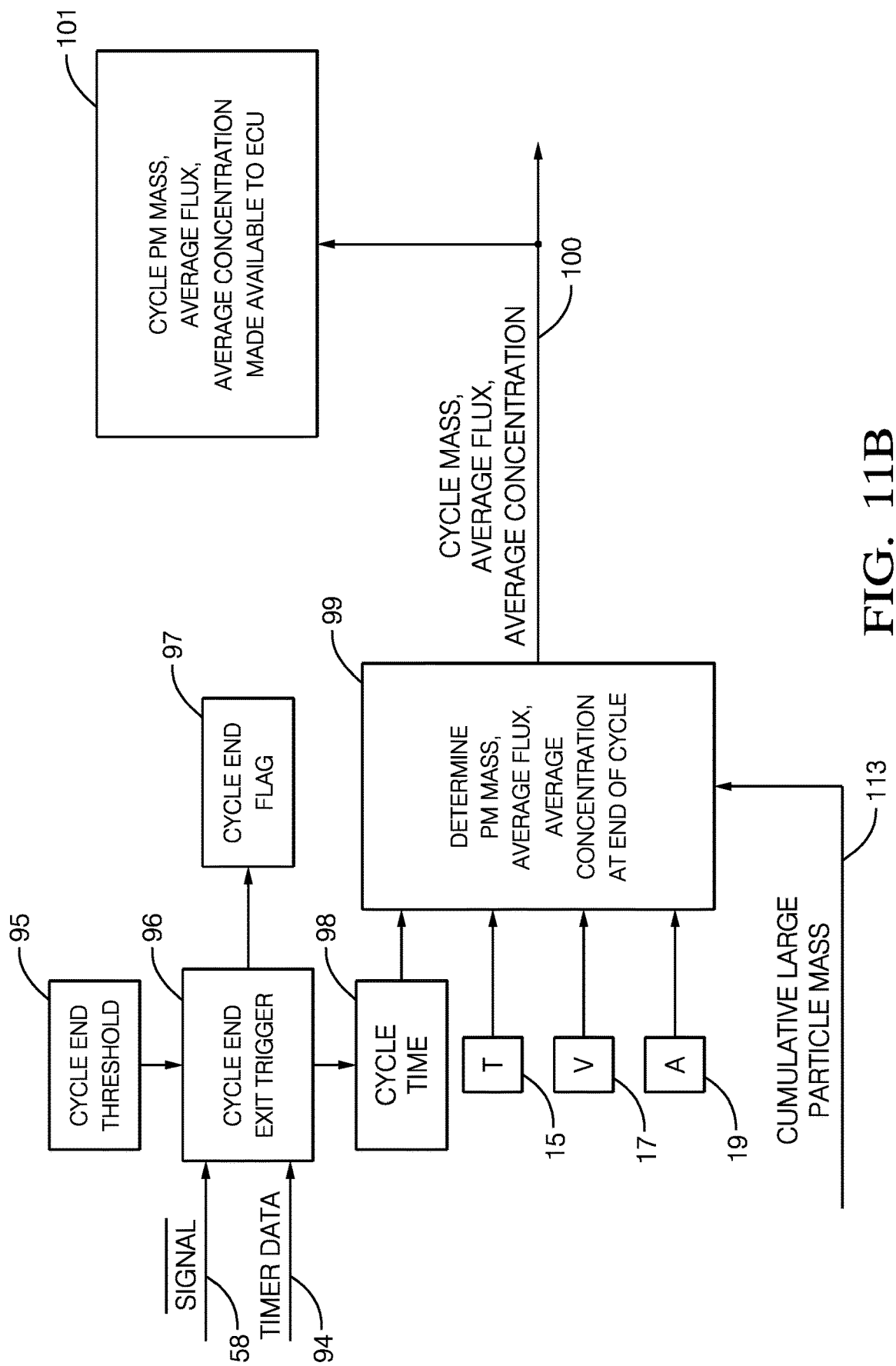
FIG. 11B schematically depicts the use of the corrected signal to determine PM mass, average flux, and average concentration at the end of the sensor cycle.

Referring to FIG. 11B, similar calculations can be made at the end of the active zone 52 using the cycle time 98 which is defined as the time between start of deadband 49 and end of active zone 52, as shown below. Again referring to FIG. 11b, the signal 58 is compared to the cycle end threshold 95 by an end of cycle trigger 96 to generate an end of cycle flag 97 and a cycle time 98. The cycle time is used along with exhaust temperature 15, velocity 17 and pipe area 19 to determine (99) PM mass, average flux, and average concentration during the sensor measurement cycle. These outputs 100 can be made available 101 to the ECU at the end of cycle. End of cycle calculations are shown below.

Average Soot Concentration (mg/m³)=Cycle Cumulative Soot Flux (mg/m²)/(cycle time (s)*Avg. Velocity (m/s))

Total Soot Mass (mg)=Cycle Cumulative Soot Flux (mg/m²)*Cross-sectional Area (m²)

Avg. Soot Flux (mg/m²*s)=Cycle Cumulative Soot Flux (mg/m²)/cycle time (s)

Figure 11C:
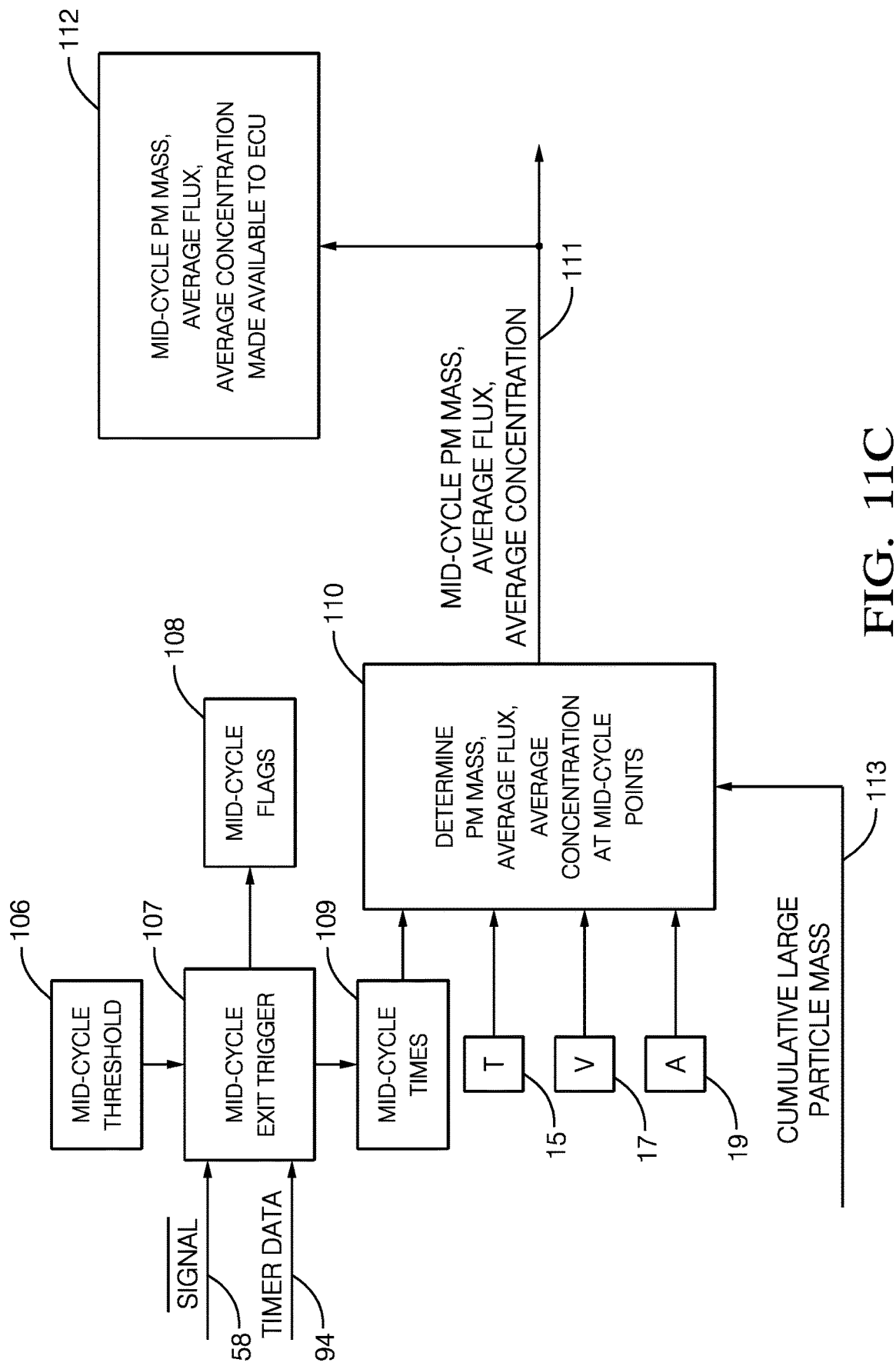
FIG. 11C schematically depicts the use of the corrected signal to determine PM mass, average flux, and average concentration at mid-cycle points of the current sensor cycle.

Furthermore, referring now to FIG. 11C, similar calculations can also be made at arbitrarily designated points (based on sensor resistance thresholds 106) within the active zone 46, using mid-cycle triggers 107, creating mid-cycle flags 108 and mid-cycle times 109 so that multiple determinations 110 of the average soot concentration, mass and flux can be provided throughout the active zone portion of the sensor cycle. These outputs 111 can be made available 112 to the ECU at the various points throughout the cycle. Mid-cycle calculations are shown below. This data can also be used to report end of PM cycle information if the cycle is terminated early for any reason including a detected instability in the accumulated soot.

Average Soot Concentration (mg/m³)=Mid-Cycle Cumulative Soot Flux (mg/m²)/(Mid-cycle time (s)*Avg. Velocity (m/s))

Total Soot Mass (mg)=Mid-Cycle Cumulative Soot Flux (mg/m²)*Cross-sectional Area (m²)

Avg. Soot Flux (mg/m²*s)=Mid-Cycle Cumulative Soot Flux (mg/m²)/Mid-cycle time (s)

Figure 11D:
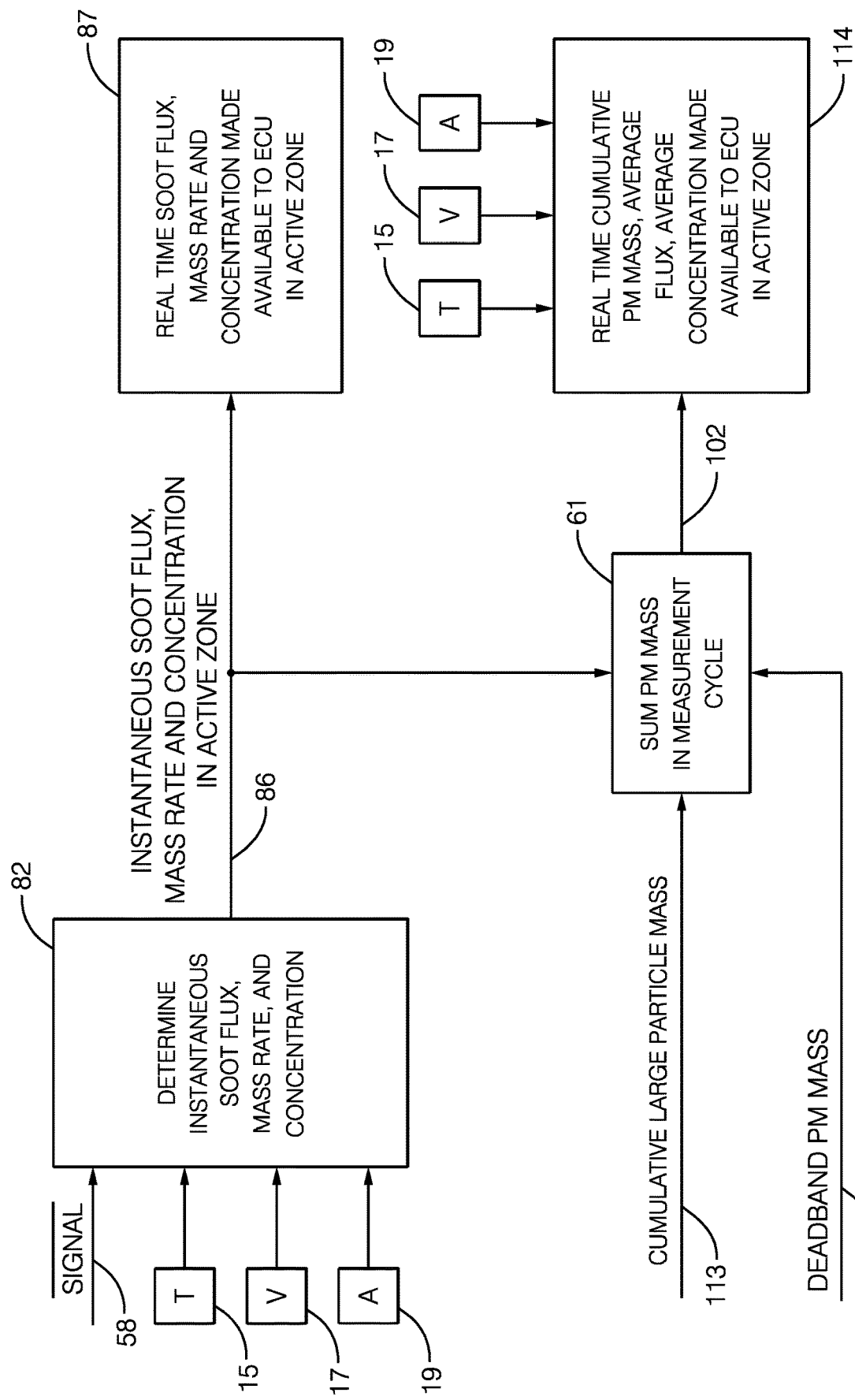
FIG. 11D schematically depicts the use of the corrected signal to determine instantaneous real-time PM mass rate, flux, and concentration along with cumulative PM mass, average flux and average concentration during the active zone of the current sensor cycle.
Figure 11E:
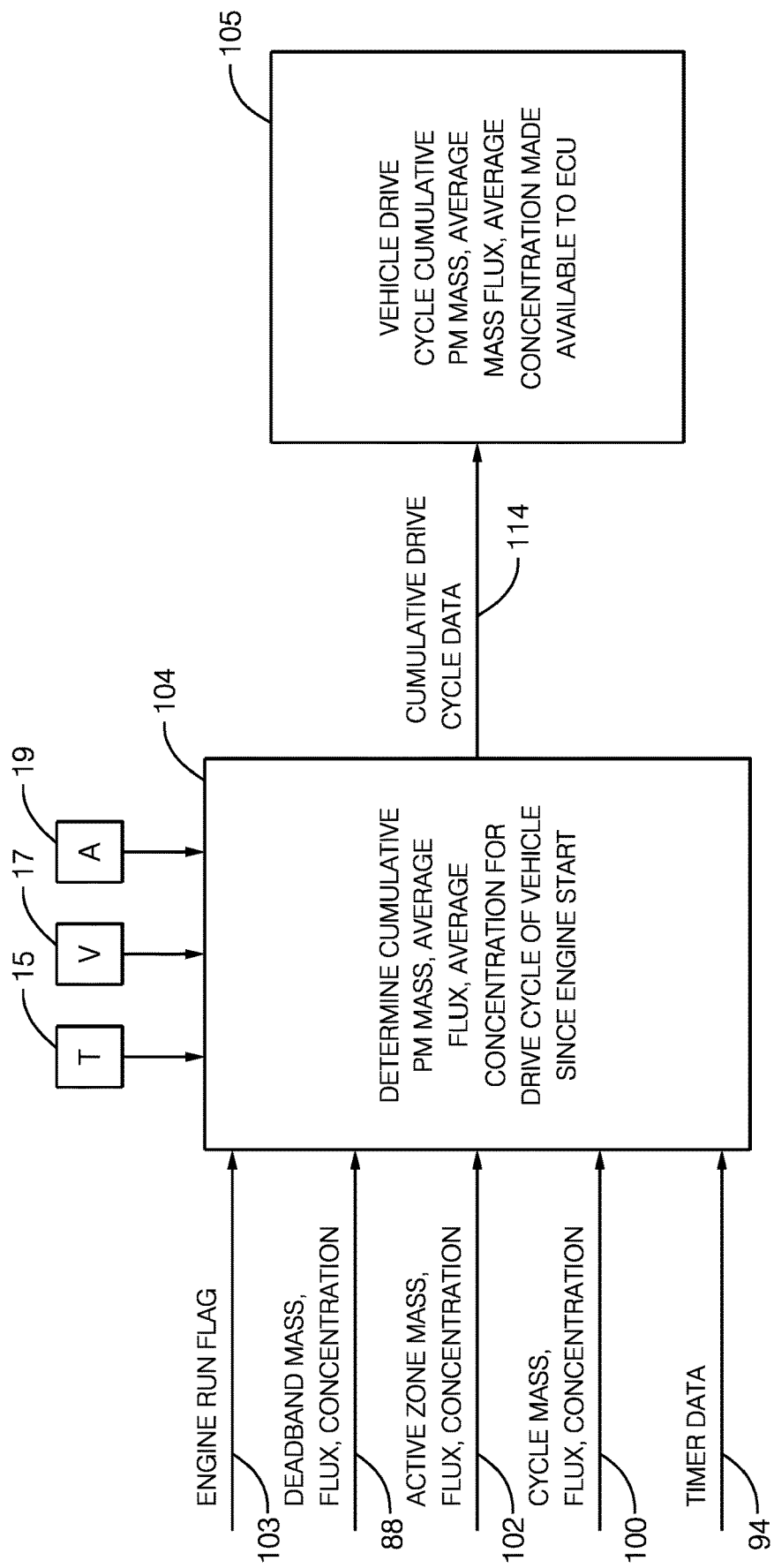
FIG. 11E schematically depicts the use of the aforementioned signals in FIGS. 11A-11D to determine cumulative vehicle drive cycle PM mass, average flux, and average concentration of the current vehicle drive cycle.

FIG. 11D describes a method which provides real-time instantaneous soot flux, mass rate, and concentration while the sensor is operating in the active zone. Corrected signal 58 is used to determine an instantaneous PM mass flux using the equation below.

In active zone 46, according to the disclosed embodiment, the sensor measurement controller 23 determines the soot flux rate by using the equation:

$$\text{soot flux} = k \frac{d^2 G}{dt^2}$$

The constant, k, is an exhaust gas velocity-dependent constant that is empirically determined. This second derivative of the conductance, G, which is the inverse of the resistance, R, provides the PM mass flux (mg/m² s), mass rate (mg/s) and real-time concentration (mg/m³) 82, using exhaust velocity and the exhaust pipe cross-sectional area as described in more detail below. This second order response occurs only in the active zone, the response is first order before and after the active zone. The instantaneous mass flux, mass rate, and concentration data can be made available 87 to the ECU on a real-time basis. The corrected particulate matter accumulation rate calculation from the active zone (signal 86 in FIG. 11D) is added to the PM mass determination from the deadband zone 88 (block 89), along with the estimated cumulative large particle mass 113 (block 84) to provide the cumulative real-time particulate mass up to that point in the measurement cycle (block 61). This sum can be continually updated at regular time intervals so that continuous particulate mass accumulation data is readily available to the ECU through the remaining duration of the cycle. With additional calculations, a measure of the cumulative soot mass or soot concentration are made available 114 to the ECU using exhaust velocity and the exhaust pipe cross-sectional area. In this manner, total accumulated particulate matter can be determined and then used for sensor regeneration and/or engine/vehicle testing and diagnostic procedures.

Real-time Cumulative Soot Mass in active zone (mg)=Deadband mass (mg)+Integral of real-time active zone mass (mg)

Real-time Avg. Soot Flux in active zone ($mg/m^2 \cdot s$)=Running average of instantaneous soot flux in active zone ($mg/m^2 \cdot s$)

Real-time Avg. Soot Concentration in active zone ($mg/m^3$)=Real-time Avg. Soot Flux ($mg/m^2$)/ (Active zone time (s)*Avg. Active Zone Velocity (m/s))

Cumulative drive cycle information can be obtained by combining the above mentioned PM flux, mass and concentration information collected during the deadband 88, active zone 102, and end of cycle 100 along with the timer data 94, temperature 15, velocity 17, and pipe area 19 data and an engine run flag 103 from the ECU. Using this information, a determination can be made 104 regarding the cumulative PM mass, average flux and average concentration for the current vehicle drive cycle since engine start. This information 114 can then be made available 105 to the ECU. Data from the previous sensor cycle 100 can be used to generate an estimate of the ongoing soot mass rate, flux and concentration using extrapolation of the system performance from the most recent performance data from the active zone 102 to predict system performance in the current sensor deadband zone. Once the sensor exits deadband, the current cycle deadband data 88 is used to correct the estimate that was based on the previous cycle. Data from the current active zone 102 is then used to keep the drive cycle data 114 updated to the current real-time status. At the end of the sensor cycle, cycle data 100 can be used to fine tune data drive cycle data generated during the active zone. Equations used are identical to those listed above with the exception that cumulative values and timers do not reset to zero at each sensor end of cycle.

Figure 12:
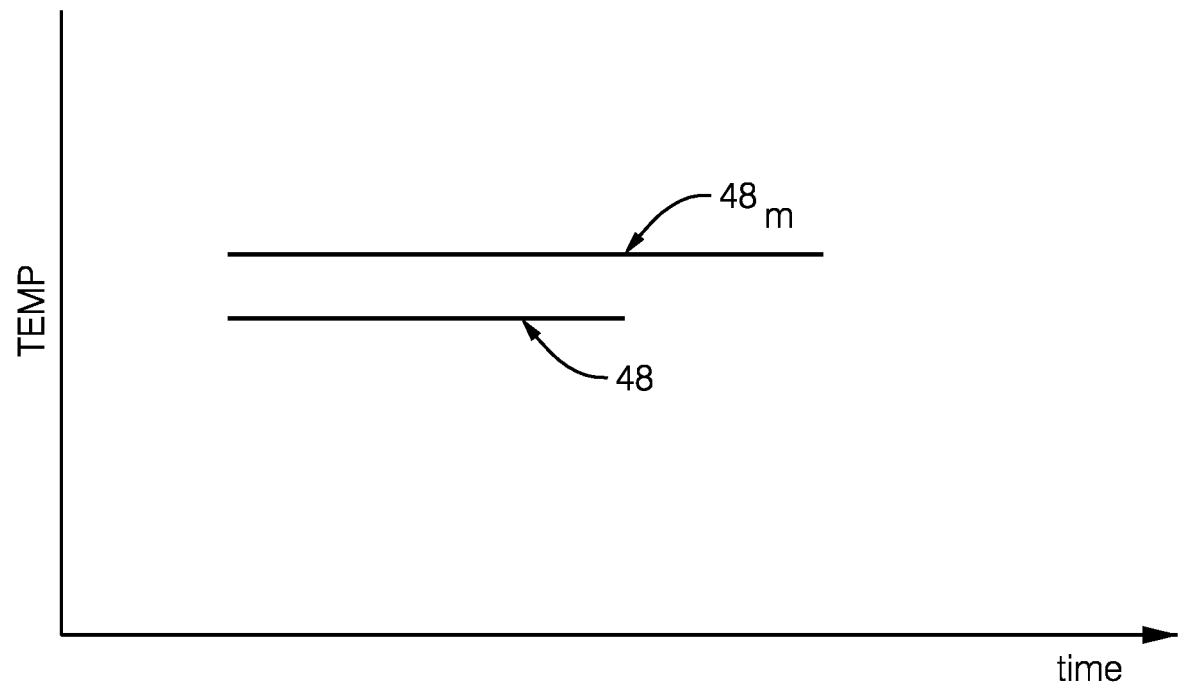
FIG. 12 illustrates a regeneration zone and a modified regeneration zone.

During typical operation, heater 26 is operated to elevate the temperature of PM sensor 20 to a first predetermined temperature for a first predetermined time in order to oxidize the particulate matter accumulated on PM sensor 20, thereby returning sensing cycle 42 to deadband zone 44. The first predetermined temperature is selected to be adequate for oxidizing the particulate matter accumulated on PM sensor 20 while being compatible with the structure of PM sensor 20 since it is known that elevating the temperature of PM sensor 20 sufficiently high or sufficiently frequently may compromise the structural integrity of PM sensor 20, thereby shortening its service life. The first predetermined time is also selected to be adequate for oxidizing the particulate matter accumulated on PM sensor 20. The first predetermined temperature and the first predetermined time may be determined experimentally, and in the present embodiment of PM sensor 20 the first predetermined temperature may be about 800° C. and the first predetermined time may be about 30 seconds. The Inventors have discovered that when an unstable soot deposit condition has been detected, for example d previously, the unstable soot deposit condition is more likely to be repeated in subsequent sensor cycles. The Inventors have also discovered that interrupting the sensing cycle with a modified regeneration zone $48_m$ (shown in FIG. 12) in which heater 26 is operated to elevate the temperature of PM sensor 20 to a second predetermined temperature which is greater than the first predetermined temperature is beneficial in order to minimize or eliminate the likelihood of repeating the unstable soot deposit condition. In addition to or in the alternative, heater 26 may be operated to elevate the temperature of PM sensor 20 in modified regeneration zone $48_m$ for a second predetermined time which is longer than the first predetermined time. It should be noted that any portion of sensing cycle 42, i.e. deadband zone 44, active zone 46, and regeneration zone 48, may be interrupted by modified regeneration zone $48_m$. The Inventors have also discovered that the temperature for modified regeneration zone $48_m$ need not depart greatly from the temperature of regeneration zone 48 to be effective, for example it has been discovered that an increase of as little as 15° C. may be sufficient for modified regeneration zone $48_m$. The inventors have also discovered that the increased time of regeneration may be at least 50% greater than the time associated with regeneration zone 48. The increased temperature and/or time of modified regeneration zone $48_m$ compared to regeneration zone 48 ensures a thorough cleaning of PM sensor 20 to the benefit of subsequent sensor cycles. However, since modified regeneration zone $48_m$ is only used periodically, PM sensor 20 benefits from the lower temperature and/or time of regeneration zone 48 by increasing the service life due to lower thermal stress being placed on PM sensor 20 when the regeneration zone 48 is typically sufficient for regenerating PM sensor 20.

While unstable soot deposit condition has been detected, described as a trigger for modified regeneration zone $48_m$, it should be understood that other triggers may be used to initiate modified regeneration zone $48_m$ and may include an operating condition of PM sensor 20 as well as conditions not associated with an operating condition of PM sensor 20. The triggers which involve operating conditions of PM sensor 20 may primarily be associated with anomalies relating to accumulation of the particulate matter on PM sensor 20 such as a large particle strike conditions on PM sensor 20 and blow-off conditions on PM sensor 20, both of which were described previously. More specifically, the large particle strike condition on PM sensor 20 may be used as a trigger for initiating modified regeneration zone $48_m$ when one or more of the following occurs: 1) the occurrence of sudden increase of conductance between electrodes 34 being caused by the particulate matter having an equivalent mass that is greater than or equal to a first equivalent mass threshold, 2) the occurrence of sudden increase of conductance between electrodes 34 occurring a predetermined number of times during the sensing cycle, and 3) the occurrence of sudden increase of conductance between electrodes 34 occurring one or more times during the sensing cycle such that the occurrence of sudden increase of conductance between electrodes 34 occurring one or more times during the sensing cycle causes apparent accumulation of the particulate matter having a mass that is greater than or equal to a second equivalent mass threshold. Relative to the occurrence of sudden increase of conductance between electrodes 34 being caused by the particulate matter having a mass that is greater than or equal to a first equivalent mass threshold, it should be noted that this is a single event rather than an accumulation of multiple large strike conditions. Also more specifically, the blow-off condition on PM sensor 20 may be used as a trigger for initiating modified regeneration zone $48_m$ when one or more of the following occurs: 1) the occurrence of sudden decrease of conductance between electrodes 34 caused by the particulate matter having an equivalent mass that is greater than or equal to a third equivalent mass threshold, 2) the occurrence of sudden decrease of conductance between electrodes 34 occurring a predetermined number of times during the sensing cycle, and 3) the occurrence of sudden decrease of conductance between electrodes 34 occurring one or more times during the sensing cycle such that the occurrence of sudden decrease of conductance between electrodes 34 occurring one or more times during the sensing cycle causes loss of the particulate matter from the particulate matter sensor having an equivalent mass that is greater than or equal to a fourth equivalent mass threshold. Relative to the occurrence of sudden decrease of conductance between electrodes 34 being caused by the particulate matter having a mass that is greater than or equal to a third equivalent mass threshold, it should be noted that this is a single event rather than an accumulation of multiple blow-off conditions. Furthermore, it should be understood that combinations of the aforementioned occurrences of the large particle strike condition together with aforementioned occurrences of the blow-off condition may be used as the trigger for initiating modified regeneration zone $48_m$. In other words, the trigger may be, by way of non-limiting example only, the occurrence of sudden increase of conductance between electrodes 34 occurring a predetermined number of times during the sensing cycle together with the occurrence of sudden decrease of conductance between electrodes 34 occurring a predetermined number of times during the sensing cycle. As used herein, equivalent mass is used to mean the amount of PM accumulation under normal operation that would be required to cause a change in sensor conductance of the same magnitude as caused by the anomaly and apparent accumulation is used to mean a change in sensor conductance that would normally be considered as PM accumulation, but is instead an artifact of the anomaly. While triggers for initiating modified regeneration zone $48_m$ that involve an operating condition of PM sensor 20 may primarily be associated with anomalies relating to accumulation of the particulate matter large on PM sensor 20, other operating conditions of PM sensor 20 that are not anomalies may also be used as the trigger, and may be by way of non-limiting example only, a predetermined number of sensing cycles 42 being completed since the last time modified regeneration zone $48_m$ was used.

As mentioned previously, the trigger for initiating modified regeneration zone $48_m$ may be a condition that is not associated with an operating condition of PM sensor 20. By way of non-limiting example only, ECU 21 may conclude that DPF 16 is faulty, however, before reporting the fault of DPF 16, ECU may initiate modified regeneration zone $48_m$ in an effort to ensure that the conclusion of fault in DPF 16 is not the result of PM sensor 20 not being completely cleaned by regeneration zone 48 which may result in an erroneous PM calculation and thereby an erroneous determination that DPF 16 is faulty. Other triggers that may be used to initiate modified regeneration zone $48_m$ may be, by way of non-limiting example only a predetermined number of drive cycles being completed, a predetermined drive distance being completed, or a predetermined run time of engine 12 being completed.

Figure 10C:
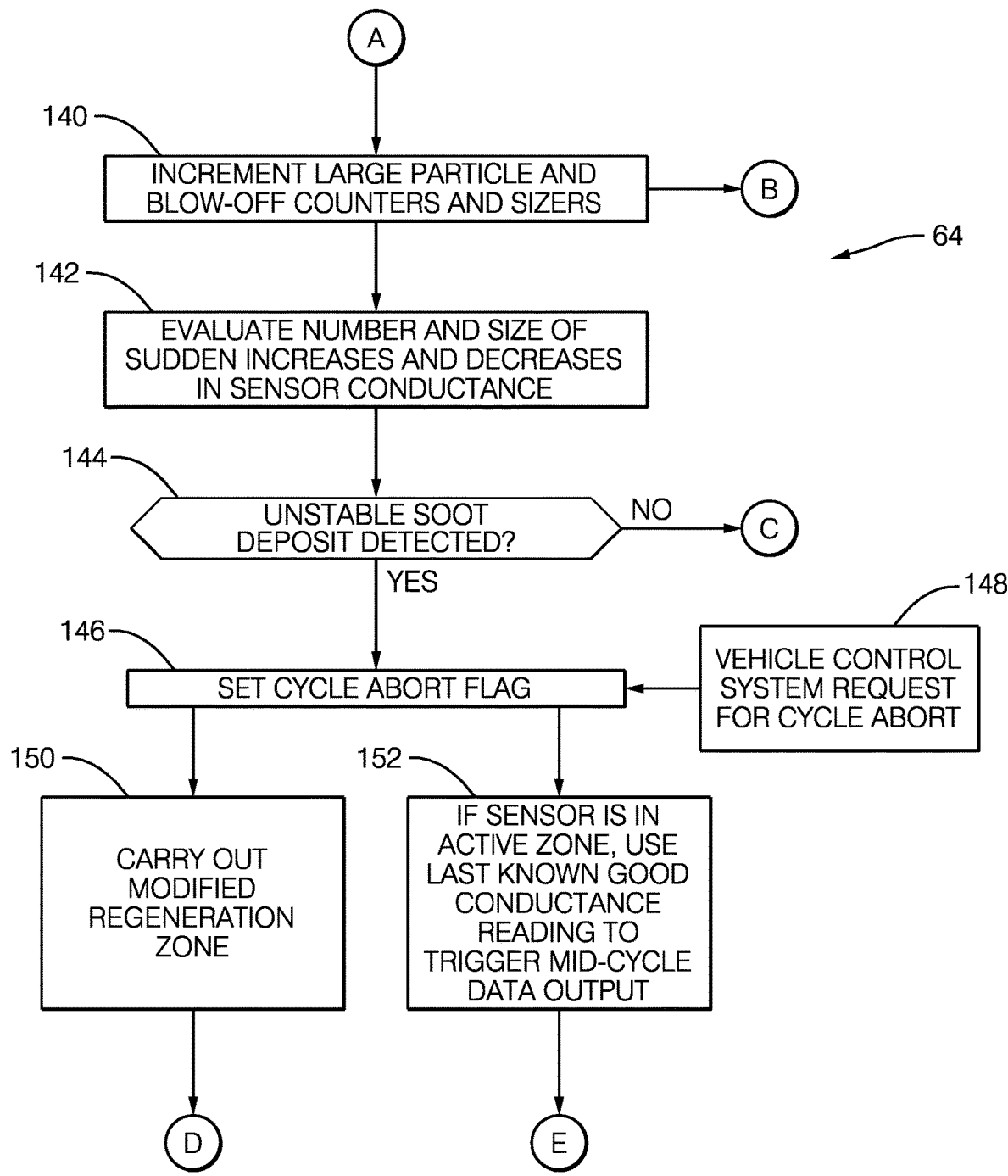
FIG. 10C schematically depicts a method for determining the use of a modified regeneration zone.

Method 64 as shown in FIG. 10 will now be described to show implementation of modified regeneration zone $48_m$ where method 64 is continued on FIG. 10C. It should be noted that connector circles A, B, C, D, and E are provided to illustrate where FIG. 10C ties into FIGS. 10 and 10A. As shown in FIG. 10, when undesired deviations from the adjacent samples are identified in block 76, the method proceeds not only to block 77 where the undesired deviations from the adjacent samples are identified and removed with respect to normal sample points to remove the error effects of the anomaly, but also proceeds to block 140 (follow connector A in FIG. 10 to connector A in FIG. 10C) where large particle and blow-off counters and sizers are incremented. In this way, the number of occurrences of large particle strike conditions, the number of occurrences of blow-off conditions, the cumulative mass of particulate matter accumulated due to large particle strike conditions, and the cumulative mass of particulate matter lost due to blow-off conditions during sensing cycle 42 is recorded. From block 140, two paths are followed in the method. One path is to proceed to block 80 (follow connector B in FIG. 10C to connector B in FIG. 10) where the total accumulated particulate matter is determined. The other path is to proceed to block 142 where one or more of the counters and sizers is evaluated and compared against a corresponding threshold in order to determine in block 144 if unstable soot deposit is detected. For example, each occurrence of sudden increase in conductance, i.e. large particle strike condition, may be evaluated for being greater than or equal to a first equivalent mass threshold, the quantity of occurrences of sudden increase in conductance during sensing cycle 42 may be evaluated for being greater than or equal to a sudden increase in conductance quantity threshold, the cumulative sum of particulate matter accumulated due to occurrences of sudden increase in conductance during sensing cycle 42 may be evaluated for being greater than or equal to a second equivalent mass threshold, each occurrence of sudden decrease in conductance, i.e. blow-off condition, may be evaluated for being greater than or equal to a third equivalent mass threshold, the quantity of occurrences of sudden decrease in conductance during sensing cycle 42 may be evaluated for being greater than or equal to a sudden decrease in conductance quantity threshold, and the cumulative sum of particulate matter lost due to occurrences of sudden decrease in conductance during sensing cycle 42 may be evaluated for being greater than or equal to a fourth equivalent mass threshold. As mentioned previously, these comparisons may be individual or in combination. If unstable soot deposit is not detected in block 144, the method proceeds to block 78 (follow connector C in FIG. 10C to connector C in FIG. 10) where the sample points in the revised array of the first differential of conductance are then summed in a new sampling time domain equal to the length of the array. Conversely, if unstable soot deposit is detected in block 144, the method proceeds to block 146 where a cycle abort flag is set. As illustrated in FIG. 10C, an alternative to arriving at block 146 is by way of block 148 where the vehicle control system requests the cycle abort. From block 146, two paths are followed in the method. One path is to proceed to block 150 where modified regeneration zone $48_m$ is carried out, i.e. PM sensor 20 is regenerated with one of a greater temperature and length of time compared to regeneration zone 48. Block 150 is then followed by proceeding to block 119 (follow connector D in FIG. 10C to connector D in FIG. 10A). The other path following block 146 is to proceed to block 152 where a mid-cycle data output is triggered if the last known good conductance reading took place in active zone 46. Block 152 is then followed by proceeding to block 112 (follow connector E in FIG. 10C to connector E in FIG. 10A where mid-cycle PM mass, average flux, and average concentration are reported.

The method described herein associated with periodic implementation of modified regeneration zone $48_m$ increases the reliability of the output of PM sensor 20 while maintaining the service life longevity that is desired of PM sensor 20 by minimizing thermal stress to which PM sensor 20 is subjected. The processor and memory disclosed herein may contain stored instructions that, when carried out, cause the method to transpire.

As described previously, applying a greater bias voltage to electrodes 34 during deadband zone 44 and a smaller bias voltage to electrodes 34 during active zone 46 provides for PM sensor 20 providing information about PM concentration in the exhaust gases for a greater percentage of the sensing cycle. This increase in time spent in active zone 46 also helps to ensure that PM sensor 20 will be operating in active zone 46 when the ignition is turned off, thereby allowing PM sensor 20 to resume operation when the ignition is turned back on, without the need to regenerate PM sensor 20. This provides the ability to quickly run the DPF efficiency diagnostic early in the drive cycle test procedure, even when the soot concentrations are very low and a PM sensor 20 operated in previously known constant bias voltage method may not have exited the deadband prior to the end of the drive cycle.

The controllers, for example, controllers 21-24, which may be integrated with one another or separate, may include a processor and non-transitory memory where computer readable code for controlling operation is stored. In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controllers may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should be understood that although particular step sequences are shown, described, and claimed, the steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Furthermore, although an example embodiment has been disclosed, a worker of ordinary skill in this art would recognize that certain modifications would come within the scope of the claims. For that reason, the following claims should be studied to determine their true scope and content.

We claim:

1. A method of operating a particulate matter sensor having a pair of spaced apart electrodes and a heater, said method comprising the steps of:

accumulating particulate matter on said particulate matter sensor, thereby changing resistance and conductance between said pair of spaced apart electrodes, wherein said particulate matter sensor provides a signal that varies based upon an amount of the particulate matter on said particulate matter sensor, wherein said particulate matter sensor includes a sensing cycle that includes a deadband zone in which said resistance is greater than a first predetermined value, followed by an active zone in which said resistance is less than or equal to said first predetermined value and greater than or equal to a second predetermined value, which is followed by a regeneration zone in which said resistance is less than said second predetermined value and in which said heater is operated to elevate the temperature of said particulate matter sensor to a first predetermined temperature for a first predetermined time in order to oxidize the particulate matter accumulated on said particulate matter sensor, thereby returning said sensing cycle to said deadband zone;

prior to said resistance reaching said second predetermined value, interrupting said deadband zone or said active zone with a modified regeneration zone in which said heater is operated to elevate the temperature of said particulate matter sensor in order to oxidize the particulate matter accumulated on said particulate matter sensor, thereby returning said sensing cycle to said deadband zone, wherein said modified regeneration zone includes at least one of 1) elevating the temperature of said particulate matter sensor to a second predetermined temperature which is greater than said first predetermined temperature and 2) elevating the temperature of said particulate matter sensor for a second predetermined time which is longer than said first predetermined time.

2. A method in accordance with claim 1, wherein said modified regeneration zone includes elevating the temperature of said particulate matter sensor to said second predetermined temperature and said second predetermined temperature is at least 15° C. greater than said first predetermined temperature.

3. A method in accordance with claim 1, wherein said modified regeneration zone includes elevating the temperature of said particulate matter sensor for said second predetermined time and said second predetermined time is at least 50% greater than said first predetermined time.

4. A method in accordance with claim 1, wherein said modified regeneration zone is triggered by an anomaly relating to accumulation of the particulate matter.

5. A method in accordance with claim 4, wherein said anomaly includes at least one of an occurrence of sudden increase in conductance between said pair of spaced apart electrodes on the particulate matter sensor and an occurrence of sudden decrease in conductance between said pair of spaced apart electrodes on the particulate matter sensor.

6. A method in accordance with claim 5, wherein said modified regeneration zone is triggered at least in part at by at least one of 1) said occurrence of sudden increase in conductance between said pair of spaced apart electrodes being caused by the particulate matter having an equivalent mass that is greater than or equal to a first equivalent mass threshold, 2) said occurrence of sudden increase in conductance between said pair of spaced apart electrodes occurring a predetermined number of times during said sensing cycle, and 3) said occurrence of sudden increase in conductance between said pair of spaced apart electrodes occurring one or more times during said sensing cycle such that said occurrence of sudden increase in conductance between said pair of spaced apart electrodes occurring one or more times during said sensing cycle causes apparent accumulation of the particulate matter having an equivalent mass that is greater than or equal to a second equivalent mass threshold.

7. A method in accordance with claim 6, wherein said modified regeneration zone is triggered at least in part by at least one of 1) said occurrence of sudden decrease in conductance between said pair of spaced apart electrodes being caused by a particulate matter loss having an equivalent mass that is greater than or equal to a third equivalent mass threshold, 2) said occurrence of sudden decrease in conductance between said pair of spaced apart electrodes occurring a predetermined number of times during said sensing cycle, and 3) said occurrence of sudden decrease in conductance between said pair of spaced apart electrodes occurring one or more times during said sensing cycle such that said occurrence of sudden decrease in conductance between said pair of spaced apart electrodes occurring one or more times during said sensing cycle causes loss of the particulate matter from said particulate matter sensor having an equivalent mass that is greater than or equal to a fourth equivalent mass threshold.

8. A method in accordance with claim 5, wherein said modified regeneration zone is triggered at least in part by at least one of 1) said occurrence of sudden decrease in conductance between said pair of spaced apart electrodes being caused by a particulate matter loss having an equivalent mass that is greater than or equal to a first equivalent mass threshold, 2) said occurrence of sudden decrease in conductance between said pair of spaced apart electrodes occurring a predetermined number of times during said sensing cycle, and 3) said occurrence of sudden decrease in conductance between said pair of spaced apart electrodes occurring one or more times during said sensing cycle such that said occurrence of sudden decrease in conductance between said pair of spaced apart electrodes occurring one or more times during said sensing cycle causes loss of the particulate matter from said particulate matter sensor having an equivalent mass that is greater than or equal to a second equivalent mass threshold.

9. A method in accordance with claim 1, wherein said modified regeneration zone is triggered by a request from a controller such that said request is not associated with an operating condition of said particulate matter sensor.

10. A method in accordance with claim 9, wherein said request is based on a perceived operating condition of a diesel particulate filter.

11. A method in accordance with claim 10, wherein said method further comprises a step of determining a total accumulated particulate matter which has accumulated prior to interrupting said sensing cycle with said modified regeneration zone and outputting said total accumulated particulate matter.

12. A method in accordance with claim 1, wherein interrupting said sensing cycle with said modified regeneration zone comprises interrupting said deadband zone.

13. A controller for controlling a particulate matter sensor having a pair of spaced apart electrodes and a heater, wherein accumulating particulate matter on said particulate matter sensor changes resistance and conductance between said pair of spaced apart electrodes, wherein said particulate matter sensor provides a signal that varies based upon an amount of the particulate matter on said particulate matter sensor, wherein said particulate matter sensor includes a sensing cycle that includes a deadband zone in which said resistance is greater than a first predetermined value, followed by an active zone in which said resistance is less than or equal to said first predetermined value and greater than or equal to a second predetermined value, which is followed by a regeneration zone in which said resistance is less than said second predetermined value and in which said heater is operated to elevate the temperature of said particulate matter sensor to a first predetermined temperature for a first predetermined time in order to oxidize the particulate matter accumulated on said particulate matter sensor, thereby returning said sensing cycle to said deadband zone said controller comprising:

a processor and memory storing instructions that, when carried out, causes, prior to said resistance reaching said second predetermined value, interrupting said deadband zone or said active zone with a modified regeneration zone in which said heater is operated to elevate the temperature of said particulate matter sensor in order to oxidize the particulate matter accumulated on said particulate matter sensor, thereby returning said sensing cycle to said deadband zone, wherein said modified regeneration zone includes at least one of 1) elevating the temperature of said particulate matter sensor to a second predetermined temperature which is greater than said first predetermined temperature and 2) elevating the temperature of said particulate matter sensor for a second predetermined time which is longer than said first predetermined time.

* * * * *